(12) United States Patent
Ueoka et al.

(10) Patent No.: US 7,921,943 B2
(45) Date of Patent: Apr. 12, 2011

(54) HYBRID VEHICLE AND CONTROL METHOD THEREOF

(75) Inventors: Kiyoshiro Ueoka, Nisshin (JP); Noriaki Ikemoto, Obu (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 654 days.

(21) Appl. No.: 12/073,752

(22) Filed: Mar. 10, 2008

(65) Prior Publication Data

US 2008/0236912 A1     Oct. 2, 2008

(30) Foreign Application Priority Data

Mar. 29, 2007   (JP) ................................ 2007-087961

(51) Int. Cl.
*B60K 6/20* (2007.10)
(52) U.S. Cl. .............. 180/65.21; 180/65.265; 180/65.28
(58) Field of Classification Search ............ 180/65.265, 180/65, 275, 28, 285; 701/52; 477/43
See application file for complete search history.

(56) References Cited

U.S. PATENT DOCUMENTS

| | | | | |
|---|---|---|---|---|
| 6,033,338 | A * | 3/2000 | Jackson et al. ................... | 477/44 |
| 6,295,487 | B1 * | 9/2001 | Ono et al. ....................... | 701/22 |
| 6,569,055 | B2 * | 5/2003 | Urasawa et al. .................. | 477/5 |
| 6,823,250 | B2 * | 11/2004 | Yamaguchi et al. ............ | 701/51 |
| 7,460,943 | B2 * | 12/2008 | Yamamoto et al. ............. | 701/52 |
| 7,463,962 | B2 * | 12/2008 | Brunemann et al. ........... | 701/55 |
| 7,693,637 | B2 * | 4/2010 | Mensler et al. ................. | 701/55 |
| 7,869,926 | B2 * | 1/2011 | Tuckfield et al. ............... | 701/56 |

FOREIGN PATENT DOCUMENTS

| | | |
|---|---|---|
| JP | 2006-020481 A | 1/2000 |
| JP | 2005-124282 A | 5/2005 |
| JP | 2006-256595 A | 9/2006 |
| JP | 2006-321458 A | 11/2006 |

\* cited by examiner

*Primary Examiner* — J. Allen Shriver, II
*Assistant Examiner* — Katy Meyer
(74) *Attorney, Agent, or Firm* — Kenyon & Kenyon LLP

(57) ABSTRACT

In a hybrid vehicle according to the invention, upon satisfaction of a predetermined condition with regard to a gearshift position or a drive mode, a virtual gearshift position according to a driving condition is set to a tentative target gearshift position SPtmp (steps S471 and S472). An object gearshift position SP* is set based on the tentative target gearshift position SPtmp and a boundary value Srt to have a gentle change with a variation of smaller than 1 (step S473). A torque demand Tr* and a target rotation speed Ne* of an engine corresponding to the object gearshift position SP* are then set based on tentative torque demands Tra and Trb and tentative rotation speeds Nea and Neb in correlation to virtual gearshift positions immediately below and immediately above the object gearshift position SP* (steps S474 to S476)

17 Claims, 9 Drawing Sheets

HYBRID VEHICLE AND CONTROL METHOD THEREOF

BACKGROUND

1. Technical Field

The present invention relates to a hybrid vehicle and control method of the hybrid vehicle.

2. Description of the Prior Art

One known structure of the hybrid vehicle includes an engine, a planetary gear unit linked with a first motor and with an axle, a second motor connected to the axle, and a battery transmitting electric power to and from the first and the second motors and enables the engine to be driven at any arbitrary drive point irrespective of the setting of a gearshift position SP (see Japanese Patent Laid-Open No. 2006-321458). The available gearshift positions settable by the driver's operation of a gearshift lever in the hybrid vehicle include a sequential gearshift position, an upshift instruction position, and a downshift instruction position, in addition to the conventional gearshift positions including a drive position. In response to the driver's operation of the gearshift lever to select either the upshift instruction position or the downshift instruction position after selection of the sequential gearshift position, the speed ratio of the engine rotation speed to the vehicle speed is changeable at multiple different stages. Another proposed structure of the hybrid vehicle refers to a minimum engine speed map in response to the driver's depression of an accelerator pedal in selection of a sports drive mode to specify a minimum engine speed corresponding to the vehicle speed and controls the engine to keep the engine rotation speed higher than the specified minimum engine speed (see Japanese Patent Laid-Open no. 2005-124282). In the hybrid vehicle of this configuration, the engine rotation speed is kept at or above the specified minimum engine speed in the sports drive mode. This expands a variable torque range by the engine and ensures a quick increase or decrease in torque output from the engine.

SUMMARY OF THE INVENTION

In order to satisfy the users' diverse needs and demands, the function of selecting a drive mode and the function of enabling an operation simulating the conventional change speed process in the general automobile of changing the engine power by a step automatic transmission and outputting the changed power are adopted in the hybrid vehicle of performing torque conversion by means of the first and the second motors to change the engine power in a stepless manner and output the changed power. There is still some room for improvement in control of the hybrid vehicle with application of these functions.

In the hybrid vehicle with the function of enabling an operation simulating the conventional change speed process in the general automobile, there would thus be a demand for adequately setting a driving force demand required for driving and a drive point of an internal combustion engine. In the hybrid vehicle with the function of selecting a drive mode having tendency of an enhanced power output response to the driver's accelerator operation, there would also be a demand for adequately setting a power output characteristic in an accelerator-off state.

The present invention accomplishes at least part of the demands mentioned above by the following configurations applied to the hybrid vehicle and the control method of the hybrid vehicle.

One aspect of the invention pertains to a hybrid vehicle including: an internal combustion engine; an electric power-mechanical power input output assembly constructed to connect with a preset axle and with an engine shaft of the internal combustion engine and configured to enable output of at least part of power of the internal combustion engine to the preset axle through input and output of electric power and mechanical power; a motor configured to input and output power from and to either the preset axle or another axle different from the preset axle; an accumulator configured to transmit electric power to and from the electric power-mechanical power input output assembly and the motor; a driving restriction storage unit configured to store multiple driving restrictions in correlation to multiple virtual gearshift positions such as to allow a difference in at least either a driving force setting restriction or an engine drive point setting restriction among the respective virtual gearshift positions, each of the multiple driving restrictions including the driving force setting restriction for setting a driving force demand required for driving and the engine drive point setting restriction for setting a drive point of the internal combustion engine corresponding to the driving force demand; a tentative target gearshift position setting module configured to, upon satisfaction of a predetermined condition, set a tentative target gearshift position to a virtual gearshift position corresponding to a driving condition of the hybrid vehicle, which is selected among the multiple virtual gearshift positions based on a predetermined change speed restriction; an object gearshift position setting module configured to set an object gearshift position to enable a gentle change with a variation of smaller than 1, based on the set tentative target gearshift position and a predetermined gentle change restriction; an object driving condition setting module configured to set a driving force demand and a drive point of the internal combustion engine corresponding to the set object gearshift position, based on a tentative driving force demand and a tentative drive point of the internal combustion engine determined with driving restrictions correlated to virtual gearshift positions immediately below and immediately above the set object gearshift position; and a controller configured to control the internal combustion engine, the electric power-mechanical power input output assembly, and the motor to drive the internal combustion engine at the set drive point and to ensure output of power based on the set driving force demand.

In the hybrid vehicle according to one aspect of the invention, multiple driving restrictions are provided in correlation to multiple virtual gearshift positions. Each of the multiple driving restrictions includes the driving force setting restriction for setting the driving force demand required for driving and the engine drive point setting restriction for setting the drive point of the internal combustion engine based on the set driving force demand. The multiple driving restrictions are stored in correlation to the multiple virtual gearshift positions in the driving restriction storage unit such as to allow a difference in at least either the driving force setting restriction or the engine drive point setting restriction among the respective virtual gearshift positions. The hybrid vehicle of this aspect changes the virtual gearshift position and performs the control based on the virtual gearshift position to attain an operation simulating the conventional change speed process in the general automobile. Upon satisfaction of the predetermined condition, a virtual gearshift position corresponding to a driving condition of the hybrid vehicle, which is selected among the multiple virtual gearshift positions based on a predetermined change speed restriction is set to the tentative target gearshift position. The object gearshift position is set to enable a gentle change with a variation of smaller than 1, based on the set tentative target gearshift position and a predetermined gentle change restriction. The driving force demand and the drive point of the internal combustion engine corresponding to the set object gearshift position are set, based on a tentative driving force demand and a tentative drive point of the internal combustion engine determined with driving restrictions correlated to virtual gearshift positions immediately below and immediately above the set object gearshift position. The internal combustion engine, the electric power-mechanical power input output assembly, and the motor are controlled to drive the internal combustion engine at the set drive point and to ensure output of power based on the set driving force demand. In the hybrid vehicle provided with the multiple virtual gearshift positions correlated to the multiple driving restrictions, upon satisfaction of the predetermined condition, the object gearshift position is set to allow a gentle change, based on the virtual gearshift position corresponding to the driving condition of the hybrid vehicle and the gentle change restriction. The driving force demand and the drive point of the internal combustion engine corresponding to the set object gearshift position are then set based on the driving restrictions correlated to the virtual gearshift positions immediately below and immediately above the set object gearshift position. This arrangement enables a gentle change of the driving power and a gentle change of the drive point of the internal combustion engine by utilizing the multiple driving restrictions in correlation to the multiple virtual gearshift positions. Such drive control enables the hybrid vehicle to perform an operation simulating the conventional change speed process in the general automobile and to selectively use a stepwise variation and a gentle variation in driving force demand required for driving as well as a stepwise change and a gentle change of the drive point of the internal combustion engine based on the set driving force demand. This ensures adequate settings of the driving force demand required for driving and the drive point of the internal combustion engine. In the hybrid vehicle of this aspect, the driving force demand includes a negative driving force, that is, a braking force.

In one preferable embodiment according to one aspect of the invention, the hybrid vehicle further includes a gearshift position selector configured to allow a driver to make selection between a first gearshift position for ordinary driving and a second gearshift position with the multiple virtual gearshift positions and allow the driver to select any virtual gearshift position among the multiple virtual gearshift positions at the second gearshift position, wherein the predetermined condition is satisfied when the second gearshift position is selected but the driver does not change the virtual gearshift position. The predetermined condition is satisfied when the second gearshift position is selected but the driver does not change the virtual gearshift position. In the case of no change of the virtual gearshift position regardless of selection of the second gearshift position, it may be regarded that the driver does not demand a stepwise variation in driving force demand or a stepwise change of the drive point of the internal combustion engine. In such cases, the drive control enables a gentle variation in driving power and a gentle change of the drive point of the internal combustion engine corresponding to the object gearshift position, which gently changes based on the gentle change restriction and the tentative target gearshift position according to the driving condition of the hybrid vehicle. This arrangement ensures smooth driving of the hybrid vehicle with adequate settings of the driving force demand and the drive point of the internal combustion engine according to the driving condition of the hybrid vehicle.

In another preferable embodiment according to the above aspect of the invention, the hybrid vehicle further includes a vehicle speed sensor configured to measure a vehicle speed of the hybrid vehicle. Each of the multiple driving restrictions correlated to the multiple virtual gearshift positions includes the driving force setting restriction of defining a variation in driving force demand against the vehicle speed in an accelerator-off state and the engine drive point setting restriction of defining a variation in target rotation speed of the internal combustion engine against the vehicle speed in the accelerator-off state, and the multiple driving restrictions are designed to have differences in both the driving force setting restriction and the engine drive point setting restriction among the respective virtual gearshift positions. In the accelerator-off state specified by the driver s accelerator operation under the predetermined condition, such arrangement ensures smooth driving of the hybrid vehicle with adequate settings of the driving force demand (braking force) and the drive point of the internal combustion engine in the accelerator-off state according to the driving condition of the hybrid vehicle.

In still another preferable embodiment according to the above aspect of the invention, the hybrid vehicle further includes a vehicle speed sensor configured to measure a vehicle speed of the hybrid vehicle. Each of the multiple driving restrictions correlated to the multiple virtual gearshift positions includes the driving force setting restriction of defining a variation in driving force demand against the vehicle speed in an accelerator-on state and the engine drive point setting restriction of defining a variation in minimum rotation speed of the internal combustion engine against the vehicle speed in the accelerator-on state, and the multiple driving restrictions are designed to have a difference in the engine drive point setting restriction among the respective virtual gearshift positions. In the accelerator-on state specified by the driver's accelerator operation under the predetermined condition, such arrangement ensures smooth driving of the hybrid vehicle with a smooth variation in rotation speed of the internal combustion engine.

In another preferable embodiment according to the above aspect of the invention, the hybrid vehicle further includes: a drive mode selector configured to allow selection between a first drive mode for ordinary driving and a second drive mode having tendency of an enhanced response of power output to a driver's accelerator operation than a response in the first drive mode; and a driving force demand setting module configured to set a driving force demand in response to the driver's accelerator operation with a driving force setting restriction corresponding to either the first drive mode or the second drive mode, wherein the predetermined condition is satisfied when the second drive mode is selected and the driver's accelerator operation specifies an accelerator-off state. The predetermined condition is satisfied when the second drive mode is selected and the driver's accelerator operation specifies an accelerator-off state. The driving force setting restriction corresponding to the second drive mode may tend to set a greater value to the driving force demand against an identical accelerator operation amount, compared with the driving force setting restriction corresponding to the first drive mode. In the accelerator-off state specified by the driver's accelerator operation in combination with selection of the second drive mode having the tendency of enhanced response of power output to the driver's accelerator operation, this arrangement enables the power output characteristic, that is, the driving force demand (braking force) and the drive point of the internal combustion engine, in the second drive mode to be different from that in the first drive mode in the accelerator-off state, while ensuring the adequate settings according to the driving condition of the hybrid vehicle. This configuration is extremely advantageous in the hybrid vehicle equipped with the drive mode selector and the gearshift position selector for allowing the driver to make selection between the first gearshift position and the second gearshift position. In the hybrid vehicle of this embodiment, the power output characteristic in the second drive mode is readily differed from the power output characteristic in the first drive mode in the accelerator-off state by utilizing the multiple virtual gearshift positions at the second gearshift position and the multiple driving restrictions correlated thereto. It is thus not required to separately provide a power output characteristic in the accelerator-off state in the second drive mode from the power output characteristic in the accelerator-off state in the first drive mode.

In one preferable application of the hybrid vehicle, the gentle change restriction limits a variation of the object gearshift position both in an ascending direction and a descending direction to a range of smaller than 1. This arrangement ensures an adequate gentle change of the object gearshift position in either the ascending direction or the descending direction according to the driving condition of the hybrid vehicle.

In another preferable application of the hybrid vehicle, the change speed restriction includes a change speed diagram of defining a relation of the virtual gearshift position, a driver's accelerator operation and a vehicle speed of the hybrid vehicle. This arrangement enables the tentative target gearshift position to be set adequately according to the driving condition of the hybrid vehicle.

In still another preferable application of the hybrid vehicle, the electric power-mechanical power input output assembly includes: a motor for power generation configured to input and output power; and a three shaft-type power input output structure constructed to connect with three shafts, the axle, the engine shaft of the internal combustion engine, and a rotating shaft of the motor for power generation and configured to input and output power to and from a residual shaft based on powers input to and output from any two shafts among the three shafts.

According to another aspect, the invention is directed to a control method of a hybrid vehicle. The hybrid vehicle includes: an internal combustion engine; an electric power-mechanical power input output assembly constructed to connect with a preset axle and with an engine shaft of the internal combustion engine and configured to enable output of at least part of power of the internal combustion engine to the preset axle through input and output of electric power and mechanical power; a motor configured to input and output power from and to either the preset axle or another axle different from the preset axle; an accumulator configured to transmit electric power to and from the electric power-mechanical power input output assembly and the motor; and a driving restriction storage unit configured to store multiple driving restrictions in correlation to multiple virtual gearshift positions such as to allow a difference in at least either a driving force setting restriction or an engine drive point setting restriction among the respective virtual gearshift positions, each of the multiple driving restrictions including the driving force setting restriction for setting a driving force demand required for driving and the engine drive point setting restriction for setting a drive point of the internal combustion engine corresponding to the driving force demand, the control method including the steps of: (a) upon satisfaction of a predetermined condition, setting a tentative target gearshift position to a virtual gearshift position corresponding to a driving condition of the hybrid vehicle, which is selected among the multiple virtual gearshift positions based on a predetermined change speed restriction; (b) setting an object gearshift position to enable a gentle change with a variation of smaller than 1, based on the tentative target gearshift position set in the step (a) and a predetermined gentle change restriction; (c) setting a driving force demand and a drive point of the internal combustion engine corresponding to the object gearshift position set in the step (b), based on a tentative driving force demand and a tentative drive point of the internal combustion engine determined with driving restrictions correlated to virtual gearshift positions immediately below and immediately above the set object gearshift position; and (d) controlling the internal combustion engine, the electric power-mechanical power input output assembly, and the motor to drive the internal combustion engine at the drive point set in the step (c) and to ensure output of power based on the driving force demand set in the step (c).

Upon satisfaction of the predetermined condition, the object gearshift position is set to allow a gentle change, based on the virtual gearshift position corresponding to the driving condition of the hybrid vehicle and the gentle change restriction. The driving force demand and the drive point of the internal combustion engine corresponding to the set object gearshift position are then set based on the driving restrictions correlated to the virtual gearshift positions immediately below and immediately above the set object gearshift position. This arrangement enables a gentle change of the driving power and a gentle change of the drive point of the internal combustion engine by utilizing the multiple driving restrictions in correlation to the multiple virtual gearshift positions. Such drive control enables the hybrid vehicle to perform an operation simulating the conventional change speed process in the general automobile and to selectively use a stepwise variation and a gentle variation in driving force demand required for driving as well as a stepwise change and a gentle change of the drive point of the internal combustion engine based on the set driving force demand. This ensures adequate settings of the driving force demand required for driving and the drive point of the internal combustion engine.

In one preferable embodiment according to one aspect of the invention, the hybrid vehicle further including: a gearshift position selector configured to allow a driver to make selection between a first gearshift position for ordinary driving and a second gearshift position with the multiple virtual gearshift positions and allow the driver to select any virtual gearshift position among the multiple virtual gearshift positions at the second gearshift position, wherein the predetermined condition at the step (a) is satisfied when the second gearshift position is selected but the driver does not change the virtual gearshift position.

In another preferable embodiment according to the above aspect of the invention, the hybrid vehicle further includes a vehicle speed sensor configured to measure a vehicle speed of the hybrid vehicle. Each of the multiple driving restrictions correlated to the multiple virtual gearshift positions includes the driving force setting restriction of defining a variation in driving force demand against the vehicle speed in an accelerator-off state and the engine drive point setting restriction of defining a variation in target rotation speed of the internal combustion engine against the vehicle speed in the accelerator-off state, and the multiple driving restrictions are designed to have differences in both the driving force setting restriction and the engine drive point setting restriction among the respective virtual gearshift positions.

In still another preferable embodiment according to the above aspect of the invention, the hybrid vehicle further includes a vehicle speed sensor configured to measure a vehicle speed of the hybrid vehicle. Each of the multiple driving restrictions correlated to the multiple virtual gearshift positions includes the driving force setting restriction of defining a variation in driving force demand against the vehicle speed in an accelerator-on state and the engine drive point setting restriction of defining a variation in minimum rotation speed of the internal combustion engine against the vehicle speed in the accelerator-on state, and the multiple driving restrictions are designed to have a difference in the engine drive point setting restriction among the respective virtual gearshift positions.

In another preferable embodiment according to the above aspect of the invention, the hybrid vehicle further includes: a drive mode selector configured to allow selection between a first drive mode for ordinary driving and a second drive mode having tendency of an enhanced response of power output to a driver's accelerator operation than a response in the first drive mode; and a driving force demand setting module configured to set a driving force demand in response to the driver's accelerator operation with a driving force setting restriction corresponding to either the first drive mode or the second drive mode, wherein the predetermined condition is satisfied when the second drive mode is selected and the driver's accelerator operation specifies an accelerator-off state. The predetermined condition is satisfied when the second drive mode is selected and the driver's accelerator operation specifies an accelerator-off state. The driving force setting restriction corresponding to the second drive mode may tend to set a greater value to the driving force demand against an identical accelerator operation amount, compared with the driving force setting restriction corresponding to the first drive mode.

In one preferable application of the hybrid vehicle, the gentle change restriction limits a variation of the object gearshift position both in an ascending direction and a descending direction to a range of smaller than 1.

In another preferable application of the hybrid vehicle, the change speed restriction includes a change speed diagram of defining a relation of the virtual gearshift position to a driver's accelerator operation and a vehicle speed of the hybrid vehicle.

DESCRIPTION OF THE PREFERRED EMBODIMENTS

One mode of carrying out the invention is discussed below as a preferred embodiment.

Figure 1:
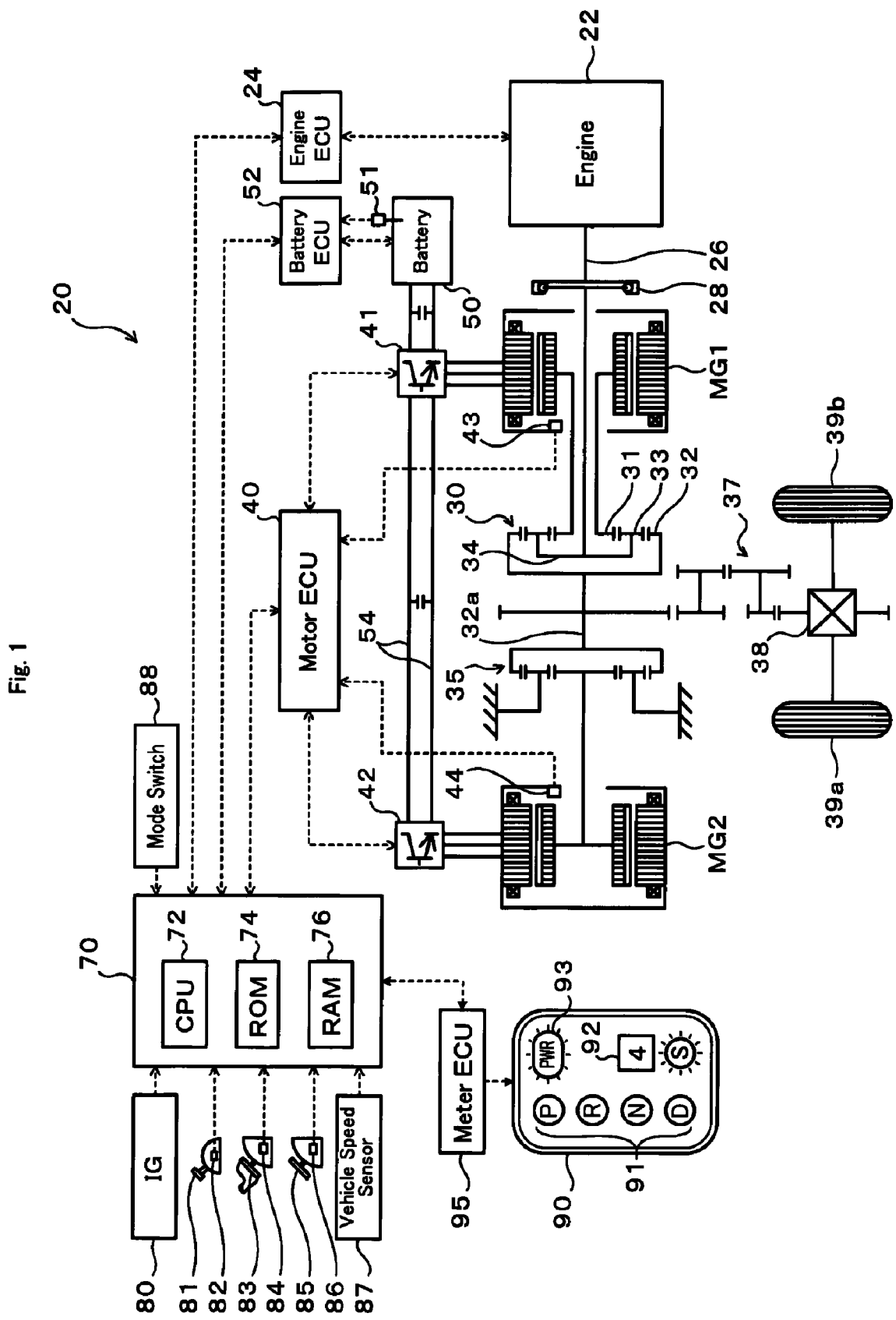
FIG. 1 schematically illustrates the configuration of a hybrid vehicle according to one embodiment of the invention.

FIG. 1 schematically illustrates the configuration of a hybrid vehicle 20 according to one embodiment of the invention. As illustrated, the hybrid vehicle 20 includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a reduction gear 35 that is attached to a ring gear shaft 32a as an axle connecting with the power distribution integration mechanism 30, a motor MG2 that is connected to the reduction gear 35, and a hybrid electronic control unit (hereafter referred to as 'hybrid ECU') 70 that controls the operations of the whole hybrid vehicle 20.

The engine 22 is an internal combustion engine that receives a supply of a hydrocarbon fuel, such as gasoline or light oil, and outputs power. The engine 22 is under control of an engine electronic control unit (hereafter referred to as 'engine ECU') 24 and is subjected to, for example, fuel injection amount regulation, ignition timing control, and intake air flow regulation. The engine ECU 24 inputs diverse signals from various sensors that are provided for the engine 22 to measure and detect the operating conditions of the engine 22. The engine ECU 24 establishes communication with the hybrid ECU 70 to drive and control the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34 as the engine-side rotational element, the sun gear 31, and the ring gear 32 as the axle-side rotational element are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed to the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators that may be actuated both as a generator and as a motor. The motors MG1 and MG2 transmit electric powers to and from a secondary battery 50 as via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with a surplus of the power generated by the motors MG1 and MG2, while being discharged to compensate for an insufficiency of the power generated by the motors MG1 and MG2. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 executes a rotation speed computation routine (not shown) and computes rotation speeds Nm1 and Nm2 of the respective rotors in the motors MG1 and MG2 from the signals input from the rotational position detection sensors 43 and 44. The motor ECU 40 establishes communication with the hybrid ECU 70 to drive and control the motors MG1 and MG2 in response to control signals from the hybrid ECU 70 and to output data regarding the operating conditions of the motors MG1 and MG2 to the hybrid ECU 70 according to the requirements.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid ECU 70 and the engine ECU 24 according to the requirements. The battery ECU 52 also performs various computations and settings required for management and control of the battery 50. A remaining charge or state of charge SOC of the battery 50 is calculated from an integrated value of the charge-discharge current measured by the current sensor. A charge-discharge power demand Pb* of the battery 50 is set corresponding to the calculated state of charge SOC. An input limit Win as an allowable charging electric power to be charged in the battery 50 and an output limit Wout as an allowable discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid ECU 70 is constructed as a microprocessor including a CPU 72, a ROM 74 that stores various processing programs, a RAM 76 that temporarily stores data, input and output ports (not shown), and a communication port (not shown) The hybrid ECU 70 receives, via its input port, an ignition signal from an ignition switch (start switch) 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 87. The hybrid ECU 70 also inputs a mode signal from a mode switch 88 to set the driver's selected drive mode of the hybrid vehicle 20. In the structure of the embodiment, the mode switch 88 may be provided on a vehicle interior switch panel (not shown) and is operated by the driver for selection of a desired drive mode among multiple available modes. The available modes include a normal mode (first drive mode) for ordinary driving of the hybrid vehicle 20 with preference to the improved fuel consumption over the power performance and a power mode (second drive mode) for power driving of the hybrid vehicle 20 with preference to the power performance over the improved fuel consumption. In response to selection of the normal mode by the driver's operation of the mode switch 88, a power mode flag Fpm is set to 0, and the engine 22 and the motors MG1 and MG2 are controlled to enable efficient operation of the engine 22 for the improved fuel consumption. In response to selection of the power mode by the driver's operation of the mode switch 88, on the other hand, the power mode flag Fpm is set to 1, and the engine 22 and the motors MG1 and MG2 are controlled to output a higher torque to the ring gear shaft 32a as the axle than the torque output in the normal mode to enhance the response of torque output to the driver's accelerator operation. The hybrid ECU 70 is connected via its communication port with the engine ECU 24, the motor ECU 40, and the battery ECU 52 to receive and send diversity of control signals and data from and to the engine ECU 24, the motor ECU 40, and the battery ECU 52 as mentioned above.

In the hybrid vehicle 20 of the embodiment, a sequential gearshift position (S position: second gearshift position) for allowing selection of any virtual gearshift position among multiple virtual gearshift positions SP1 to SP8 respectively corresponding to integral speeds, an upshift instruction position, and a downshift instruction position, as well as a parking position (P position) for parking, a reverse position (R position) for reverse driving, a neutral position (N position), and a drive position (D position: first gearshift position) for general forward driving are provided as the gearshift position SP of the gearshift lever 81. On selection of the D position as the gearshift position SP, the hybrid vehicle 20 of the embodiment drives and controls the engine 22 to enable its efficient operation. On selection of the S position as the gearshift position SP, a ratio of the rotation speed of the engine 22 to the vehicle speed V is changeable at 8 different stages (SP1 to SP8). In response to the driver's operation of the gearshift lever 81 to select the S position as the gearshift position SP, one of the multiple virtual gearshift positions SP1 to SP8 is set to an initial speed according to the vehicle speed V. At the subsequent setting of the gearshift lever 81 to the upshift instruction position, the virtual gearshift position is shifted up by one speed (upshift). At the subsequent setting of the gearshift lever 81 to the downshift instruction position, the virtual gearshift position is shifted down by one speed (downshift). The gearshift position sensor 82 outputs the speed of the current virtual gearshift position (one of SP1 to SP8) as the gearshift position SP, in response to the driver's operation of the gearshift lever 81.

A meter display unit 90 shown in FIG. 1 is provided in the vicinity of the driver's seat of the hybrid vehicle 20. The meter display unit 90 is a liquid crystal display panel and includes a gearshift position indicator 91 lighting up an alphabetical symbol (P, R, N, D, or S) corresponding to the gearshift position SP detected by the gearshift position sensor 82, a speed indicator 92 displaying the driver's currently selected speed among the virtual gearshift positions SP1 to SP8 at the setting of the S position, a mode indicator 93 lighting up a power mode mark responding to the driver's selection of the power mode, a speed meter indicator (not shown) displaying the vehicle speed V measured by the vehicle speed sensor 87, an odometer indicator (not shown) displaying an integrated travel distance, and a fuel gauge (not shown) displaying the remaining amount of fuel in a fuel tank. The meter display unit 90 is under control of a meter electronic control unit (hereafter referred to as 'meter ECU') 95, which establishes communication with the hybrid ECU 70 and the other ECUs to send and receive required data to and from the hybrid ECU 70 and the other ECUs.

The hybrid vehicle 20 of the embodiment constructed as described above sets a torque demand Tr* to be output to the ring gear shaft 32*a* as the axle linked with the drive wheels 39*a* and 39*b*, based on the vehicle speed V and the accelerator opening Acc corresponding to the driver's depression amount of the accelerator pedal 83, and controls the operations of the engine 22 and the motors MG1 and MG2 to ensure output of a power demand equivalent to the preset torque demand Tr* to the ring gear shaft 32*a*. There are several drive control modes of the engine 22 and the motors MG1 and MG2. In a torque conversion drive mode, while the engine 22 is driven and controlled to output a required level of power corresponding to a power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32*a*. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32*a*. In a motor drive mode, the motor MG2 is driven and controlled to ensure output of a required level of power corresponding to the power demand to the ring gear shaft 32*a*, while the engine 22 stops its operation.

Figure 2:
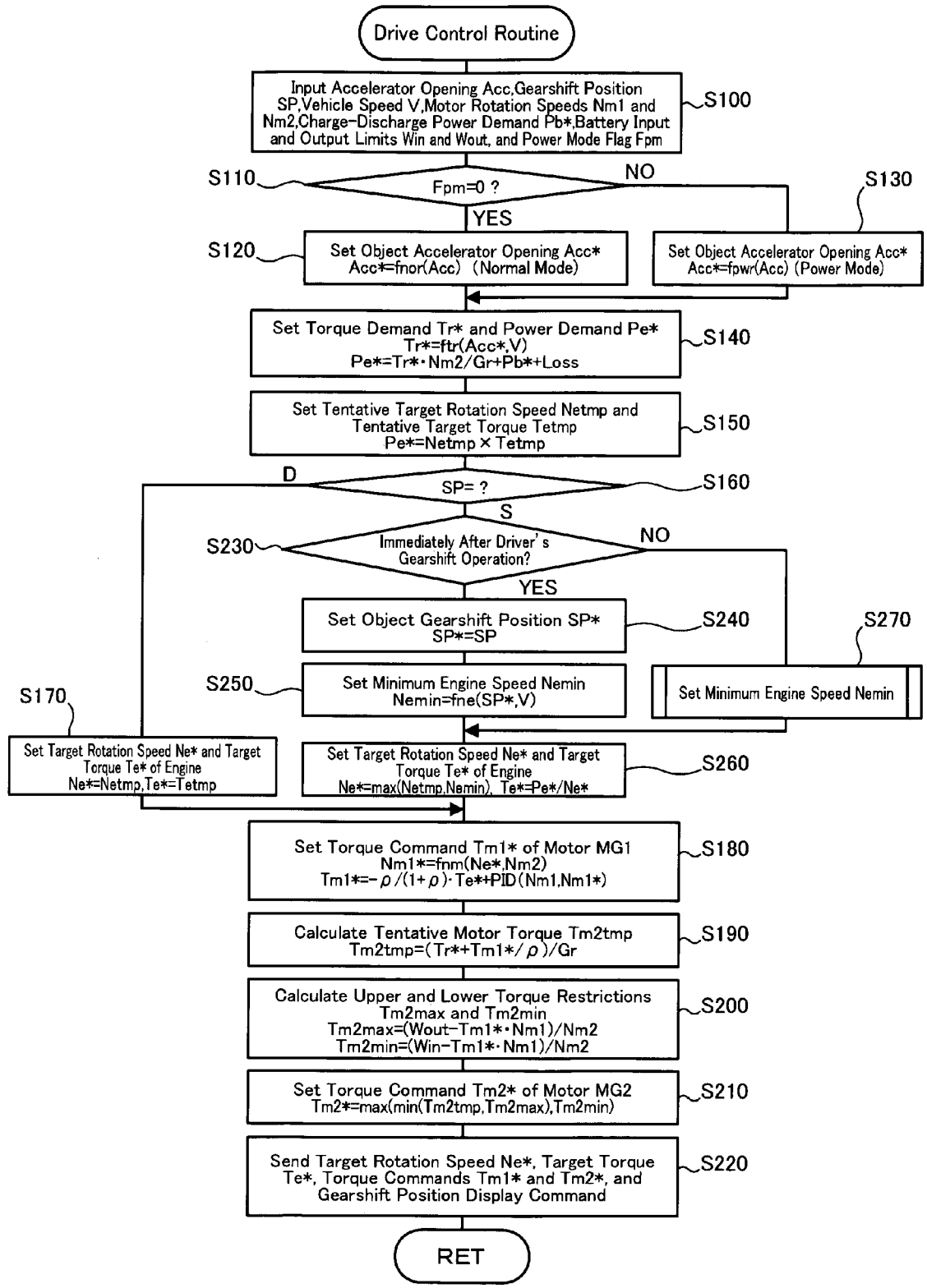
FIG. 2 is a flowchart showing a drive control routine executed by a hybrid ECU mounted on the hybrid vehicle of the embodiment.
Figure 3:
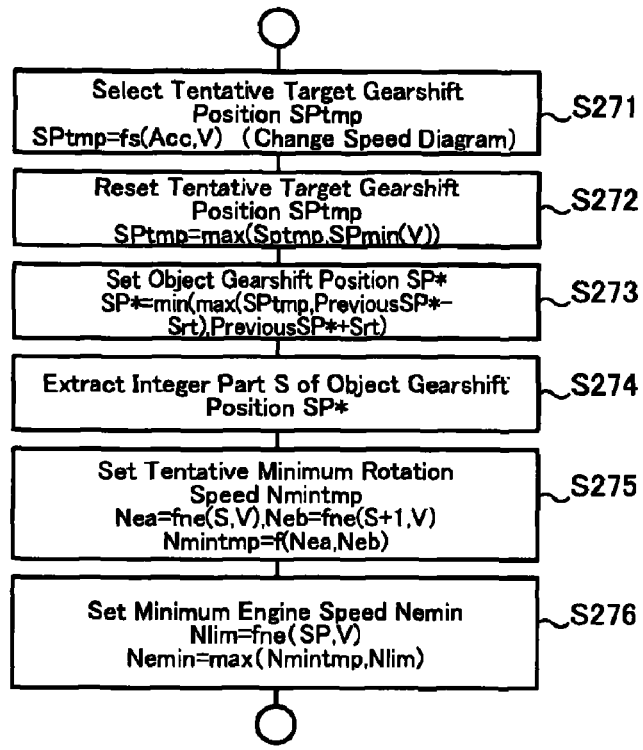
FIG. 3 is a flowchart showing the details of setting a minimum engine speed Nemin at step S270 in the drive control routine of FIG. 2.

The operations of the hybrid vehicle 20 of the embodiment are described below. The description regards first a series of drive control in an accelerator-on state induced by the driver's depression of the accelerator pedal 83 with reference to FIGS. 2 to 10 and subsequently a series of drive control in an accelerator-off state induced by the driver's release of the accelerator pedal 83 with reference to FIGS. 11 and 12 and other relevant drawings. FIG. 2 is a flowchart showing a drive control routine repeatedly executed by the hybrid ECU 70 at preset time intervals (for example, at every several msec) in the accelerator-on state specified by the driver's accelerator operation. FIG. 3 is a flowchart showing the details of setting a minimum engine speed Nemin at step S270 in the drive control routine of FIG. 2.

On the start of the drive control routine of FIG. 2, the CPU 72 of the hybrid ECU 70 first inputs various data required for control, that is, the accelerator opening Acc from the accelerator pedal position sensor 84, the gearshift position SP from the gearshift position sensor 82, the vehicle speed V from the vehicle speed sensor 87, the rotation speeds Nm1 and Nm2 of the motors MG1 and MG2, the charge-discharge power demand Pb*, the input limit Win and the output limit Wout of the battery 50, and the setting of the power mode flag Fpm (step S100). The rotation speeds Nm1 and Nm2 of the motors MG1 and MG2 are input from the motor ECU 40 by communication. The charge-discharge power demand Pb* and the input limit Win and the output limit Wout of the battery 50 are input from the battery ECU 52 by communication. The power mode flag Fpm is set corresponding to the driver's operation of the mode switch 88 by the hybrid ECU 70 and is stored in a predetermined memory area.

Figure 4:
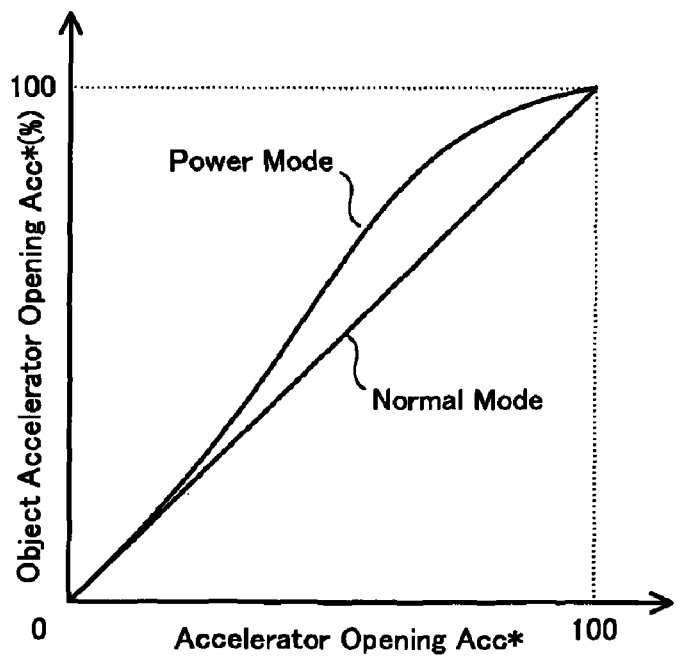
FIG. 4 shows accelerator opening setting maps in a normal mode and in a power mode.

After the data input at step S100, the CPU 72 determines whether the drive mode of the hybrid vehicle 20 is the normal mode or the power mode, based on the input setting of the power mode flag Fpm (step S110). In the case of selection of the normal mode as the drive mode represented by the power mode flag Fpm equal to 0, an object accelerator opening Acc* as a control object of accelerator opening is set corresponding to the accelerator opening Acc input at step S100 with reference to an accelerator opening setting map in the normal mode as a driving force setting restriction (step S120) In the case of selection of the power mode as the drive mode represented by the power mode flag Fpm equal to 1, on the other hand, the object accelerator opening Acc* as the control object of accelerator opening is set corresponding to the accelerator opening Acc input at step S100 with reference to an accelerator opening setting map in the power mode as the driving force setting restriction (step S130). The accelerator opening setting map in the normal mode is prepared in advance to have a linearity of the object accelerator opening Acc* relative to the accelerator opening Acc over a whole range of 0% to 100% and is stored in the ROM 74. As shown in FIG. 4, the accelerator opening setting map in the normal mode adopted in this embodiment sets the object accelerator opening Acc* equal to the accelerator opening Acc over the whole range of 0% to 100%. The accelerator opening setting map in the power mode is prepared in advance to have a specific characteristic curve and is stored in the ROM 74. As shown in FIG. 4, the accelerator opening setting map in the power mode adopted in this embodiment sets the identical values with those in the accelerator opening setting map in the normal mode to the object accelerator opening Acc* against the accelerator opening Acc in a preset low accelerator opening range from 0%. This aims to prevent the driver from feeling an abrupt acceleration of the vehicle at the low vehicle speed. The accelerator opening setting map in the power mode sets the greater values than those in the accelerator opening setting map in the normal mode to the object accelerator opening Acc* against the accelerator opening Acc in a residual range to 100% other than the preset low accelerator opening range. This aims to enhance the response of torque output to the driver's accelerator operation.

Figure 5:
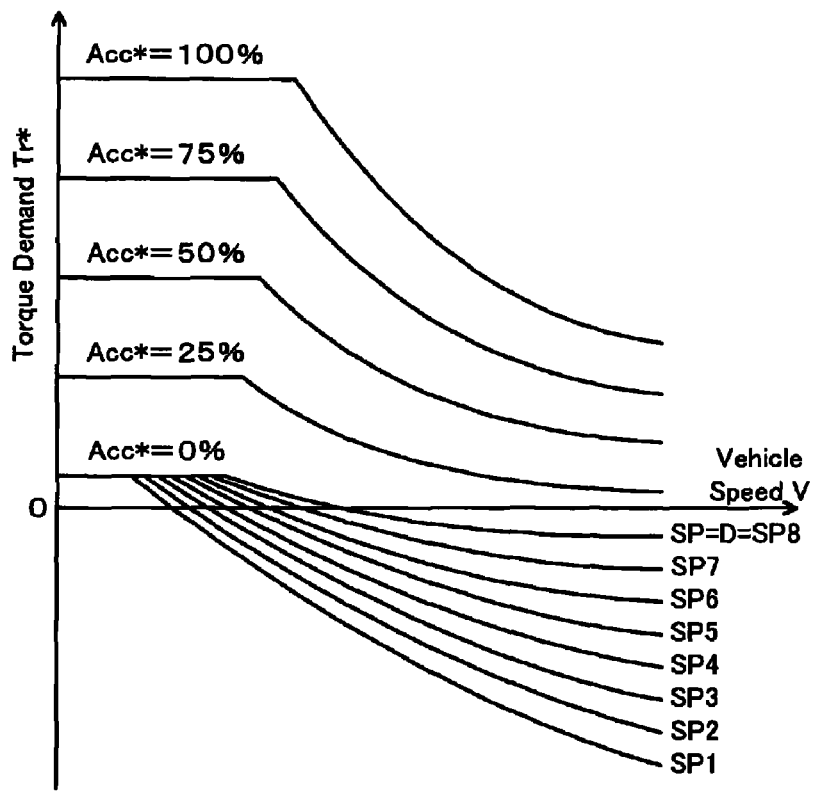
FIG. 5 shows one example of a torque demand setting map.
Figure 6:
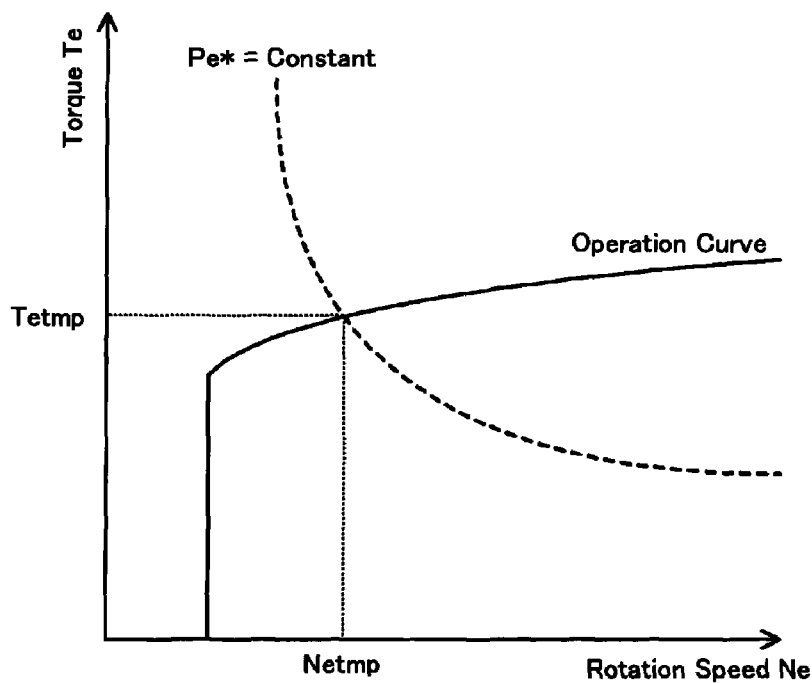
FIG. 6 shows an operation curve of an engine and a correlation curve of a torque Te to a rotation speed Ne.

The CPU 72 sets a torque demand Tr* to be output to the ring gear shaft 32*a* as the axle and a power demand Pe* required for the engine 22, based on the object accelerator opening Acc* set either at step S120 or at step S130 and the vehicle speed V input at step S100 (step S140). A concrete procedure of setting the torque demand Tr* in this embodiment stores in advance variations in torque demand Tr* against the object accelerator opening Acc* and the vehicle speed V as a torque demand setting map in the ROM 74 and reads the torque demand Tr* corresponding to the given object accelerator opening Acc* and the given vehicle speed V from this torque demand setting map. One example of the torque demand setting map is shown in FIG. 5. The torque demand setting map is designed to give one fixed value of the torque demand Tr* corresponding to each combination of the object accelerator opening Acc* and the vehicle speed V in the same restriction, regardless of the gearshift position SP set to either the D position or any of the S position (any of the virtual gearshift positions SP1 to SP8), in the accelerator-on state (Acc* >0) induced by the driver's depression of the accelerator pedal 83. Different torque demand setting restrictions (different driving force demand setting restrictions) may alternatively be provided for at least any two of the D position and the virtual gearshift positions SP1 to SP8 in the accelerator-on state (Acc* >0). Setting the higher value to the object accelerator opening Acc* in the driver's selection of the power mode than the object accelerator opening Acc* in the driver's selection of the normal mode causes the greater torque demand Tr* to be set in the power mode than the value in the normal mode. The power demand Pe* is calculated as the sum of the product of the set torque demand Tr* and a rotation speed Nr of the ring gear shaft 32a, the charge-discharge power demand Pb*, and a potential loss. The rotation speed Nr of the ring gear shaft 32a may be obtained by dividing the rotation speed Nm2 of the motor MG2 by a gear ratio Gr of the reduction gear 35 as shown in the flowchart of FIG. 2 or otherwise by multiplying the vehicle speed V by a preset conversion factor k. A tentative target drive point of the engine 22 defined by a combination of a tentative target rotation speed Netmp and a tentative target torque Tetmp is subsequently set corresponding to the power demand Pe* (step S150). In this embodiment, the tentative target rotation speed Netmp and the tentative target torque Tetmp of the engine 22 are determined according to an operation curve of ensuring efficient operation of the engine 22 and a curve of the power demand Pe*. FIG. 6 shows an operation curve of the engine 22 and a correlation curve of the torque Te to the rotation speed Ne. As clearly shown in FIG. 6, the tentative target rotation speed Netmp and the tentative target torque Tetmp are given as an intersection of the operation curve and the correlation curve of constant power demand Pe* (=Ne*× Te*). After setting the tentative target rotation speed Netmp and the tentative target torque Tetmp of the engine 22, the CPU 72 identifies the gearshift position SP input at step S100 among the D position and the virtual gearshift positions SP1 to SP8 (step S160). Upon identification of the D position as the gearshift position SP, the tentative target rotation speed Netmp and the tentative target torque Tetmp are set to a target rotation speed Ne* and a target torque Te* of the engine 22 (step S170).

After setting the target rotation speed Ne* and the target torque Te* of the engine 22 at step S170, the CPU 72 calculates a target rotation speed Nm1* of the motor MG1 from the target rotation speed Ne*, the rotation speed Nr (=Nm2/Gr) of the ring gear shaft 32a, and a gear ratio ρ (the number of teeth of the sun gear 31/the number of teeth of the ring gear 32) of the power distribution integration mechanism 30 according to Equation (1) given below, and subsequently calculates a torque command Tm1* of the motor MG1 from the calculated target rotation speed Nm1* and the current rotation speed Nm1 of the motor MG1 according to Equation (2) given below (step S180):

$$Nm1^* = Ne^* \cdot (1+\rho)/\rho - Nm2/(Gr\cdot\rho) \quad (1)$$

$$Tm1^* = -\rho/(1+\rho) \cdot Te^* + k1(Nm1^* - Nm1) + k2 \cdot \int(Nm1^* - Nm1)dt \quad (2)$$

Figure 7:
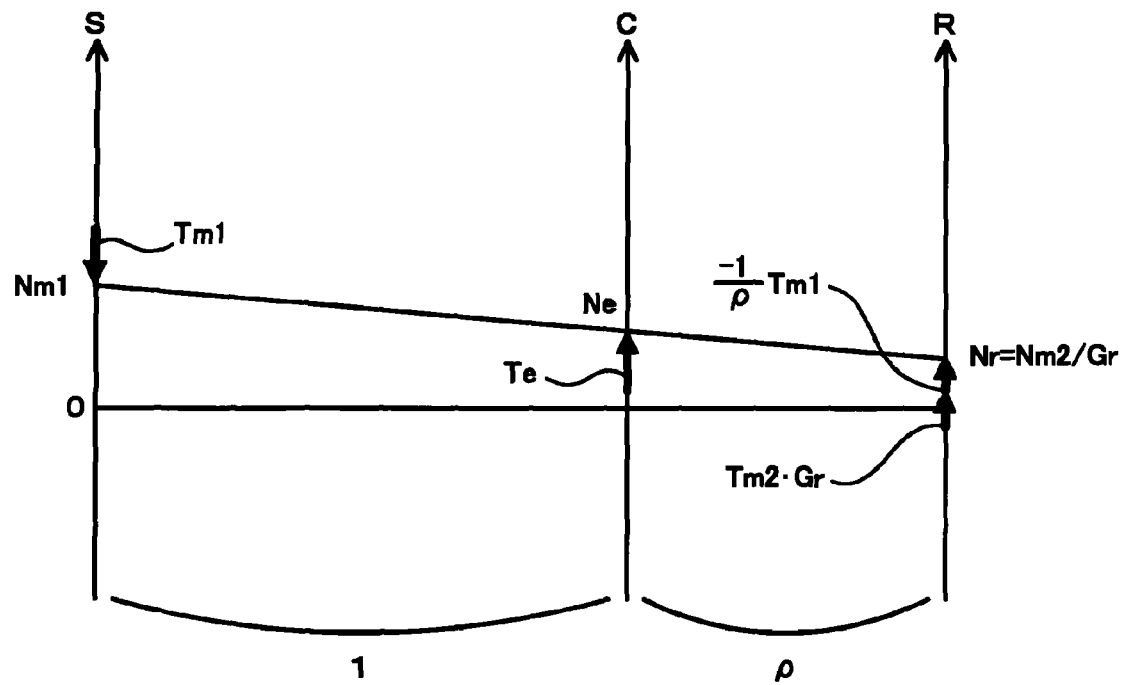
FIG. 7 is an alignment chart showing torque-rotation speed dynamics of respective rotational elements included in a power distribution integration mechanism in the hybrid vehicle of the embodiment.

Equation (1) is a dynamic relational expression of the rotational elements included in the power distribution integration mechanism 30. FIG. 7 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (1) for calculating the target rotation speed Nm1* of the motor MG1 is readily introduced from the torque-rotation speed dynamics in the alignment chart of FIG. 7. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After setting the torque command Tm1* of the motor MG1, the CPU 72 calculates a tentative motor torque Tm2tmp as a provisional value of torque to be output from the motor MG2 from the torque demand Tr*, the torque command Tm1*, the gear ratio ρ of the power distribution integration mechanism 30, and the gear ratio Gr of the reduction gear 35 according to Equation (3) given below (step S190):

$$Tm2tmp = (Tr^* + Tm1^*/\rho)/Gr \quad (3)$$

A lower torque restriction Tm2min and an upper torque restriction Tm2max as minimum and maximum torques that may be output from the motor MG2 are then calculated from the input limit Win and the output limit Wout of the battery 50, the torque command Tm1* of the motor MG1 set at step S180, and the current rotation speeds Nm1 and Nm2 of the motors MG1 and MG2 according to Equations (4) and (5) given below (step S200):

$$Tm2min = (Win - Tm1^* \cdot Nm1)/Nm2 \quad (4)$$

$$Tm2max = (Wout - Tm1^* \cdot Nm1)/Nm2 \quad (5)$$

A torque command Tm2* of the motor MG2 is set by limiting the calculated tentative motor torque Tm2tmp with the set upper torque restriction Tm2max and lower torque restriction Tm2min (step S210). Setting the torque command Tm2* of the motor MG2 in this manner restricts the torque output to the ring gear shaft 32a as the axle within the range of the input limit Win and the output limit Wout of the battery 50. Equation (3) is readily introduced from the alignment chart of FIG. 7. After setting the target rotation speed Ne* and the target torque Te* of the engine 22 and the torque commands Tm1* and Tm2* of the motors MG1 and MG2 as described above, the CPU 72 sends the target rotation speed Ne* and the target torque Te* of the engine 22 to the engine ECU 24, the torque commands Tm1* and Tm2* of the motors MG1 and MG2 to the motor ECU 40, and a gearshift position display command for displaying the gearshift position SP input at step S100 on the meter display unit 90 to the meter ECU 95 (step S220) and goes back to step S100 to repeat the above series of processing. The engine ECU 24 receives the settings of the target rotation speed Ne* and the target torque Te* and performs required controls to gain the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. The meter ECU 95 controls the display of the gearshift position indicator 91 and the speed indicator 92 in response to the received gearshift position display command.

Figure 8:
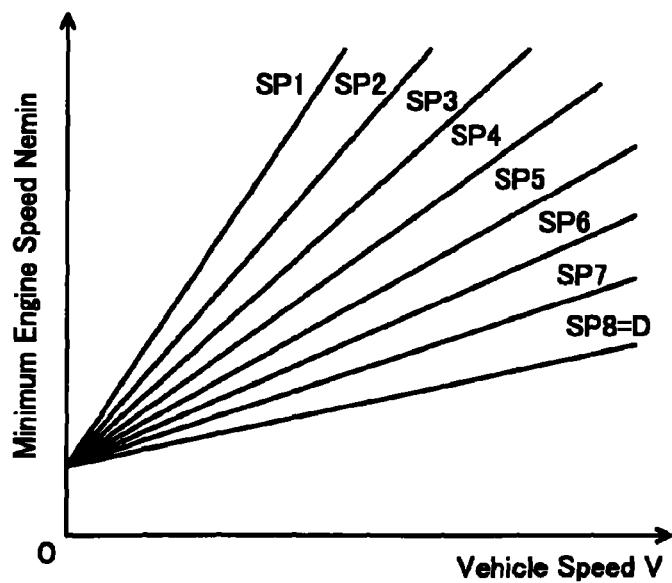
FIG. 8 shows one example of a minimum engine speed setting map.

Upon identification of one of the virtual gearshift positions SP1 to SP8 at the S position as the gearshift position SP at step S160, on the other hand, it is determined whether the current moment is immediately after the driver's gearshift operation to set the upshift instruction position or the downshift instruction position (step S230). When it is determined that the current moment is immediately after the driver's gearshift operation, the CPU 72 sets the gearshift position SP input at step S100 to an object gearshift position SP* as a control object of gearshift position (step S240) and sets a minimum engine speed Nemin as a lower limit of the rotation speed Ne of the engine 22 according to the vehicle speed V and the object gearshift position SP* (step S250). At the S position selected as the gearshift position SP, the hybrid vehicle 20 of the embodiment basically determines the minimum engine speed Nemin corresponding to the vehicle speed V and the virtual gearshift position (SP1 to SP8). The lower value is set to the minimum engine speed Nemin at the greater speed of the virtual gearshift position with regard to an identical value of the vehicle speed V. Namely the minimum engine speed Nemin decreases in an ascending order of the virtual gearshift position from SP1 to SP8. A concrete procedure of the embodiment stores in advance variations in minimum engine speed Nemin against the vehicle speed V and the speeds of the virtual gearshift positions SP1 to SP8 as a minimum engine speed setting map in the ROM 74 as shown in FIG. 8 and reads the minimum engine speed Nemin corresponding to the given vehicle speed V and the given object gearshift position SP* from the minimum engine speed setting map. In the accelerator-on state of the hybrid vehicle 20, different drive point setting restrictions (different target rotation speed setting restrictions) of the engine 22 are correlated to the virtual gearshift positions SP1 to SP8. After setting the minimum engine speed Nemin at step S250, the CPU 72 sets the greater between the tentative target rotation speed Netmp and the minimum engine speed Nemin to the target rotation speed Ne* of the engine 22 and computes the target torque Te* of the engine 22 by dividing the power demand Pe* set at step S160 by the target rotation speed Ne* (step S260). The CPU 72 subsequently executes the processing of steps S180 to S220 as explained above.

Figure 9:
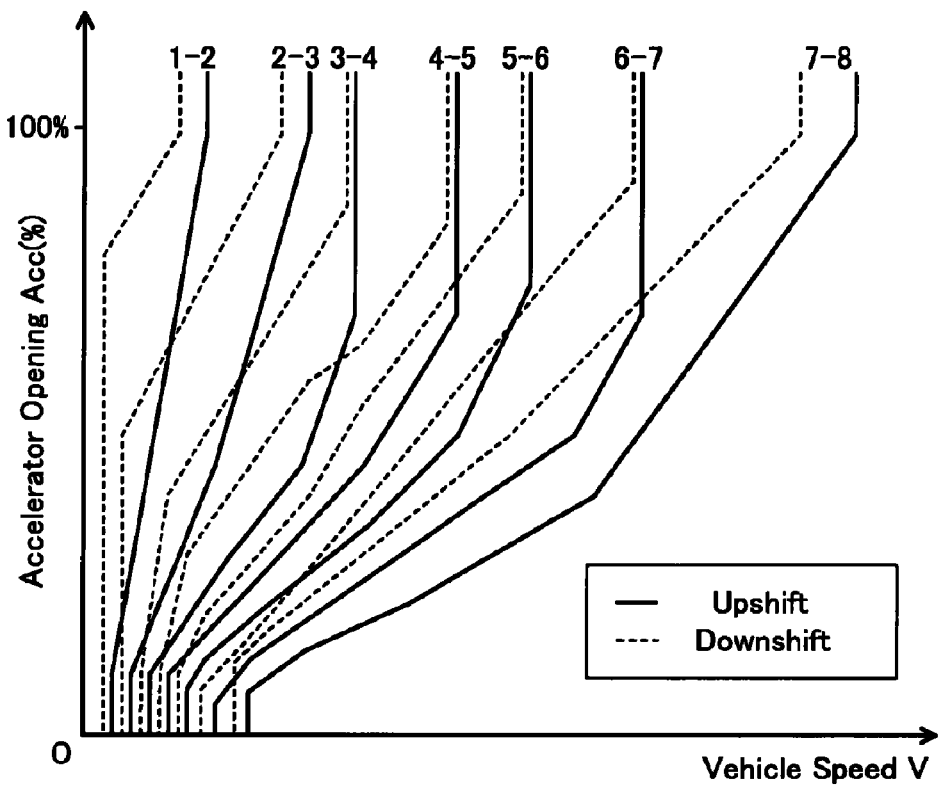
FIG. 9 is a change speed diagram showing variations in target speed against accelerator opening Acc and vehicle speed V.

When it is determined at step S230 that the current moment is not immediately after the driver's gearshift operation, the CPU 72 sets the minimum engine speed Nemin at step S270. In this state, even at the setting of the gearshift position SP to the S position, the driver does not make a gearshift operation to set the upshift instruction position or the downshift instruction position for a change of the virtual gearshift position. The details of the processing at step S270 are shown in the flowchart of FIG. 3. The CPU 72 selects a tentative target gearshift position SPtmp suitable for the driving conditions of the hybrid vehicle 20 among the multiple virtual gearshift positions SP1 to SP8, based on the accelerator opening Acc and the vehicle speed V input at step S100 (step S271). A concrete procedure of setting the tentative target gearshift position SPtmp in this embodiment prepares in advance and stores in the ROM 74 a change speed diagram representing variations in target gearshift position (target speed) against the vehicle speed V and the accelerator opening Acc corresponding to the driver's accelerator operation as shown in FIG. 9. In the accelerating state of the hybrid vehicle 20, the target speed corresponding to the combination of the given accelerator opening Acc and the given vehicle speed V is read from upshift curves shown by the solid line in the change speed diagram of FIG. 9 and is set to the tentative target gearshift position SPtmp at step S271. In the decelerating state of the hybrid vehicle 20, on the other hand, the target speed corresponding to the combination of the given accelerator opening Acc and the given vehicle speed V is read from downshift curves shown by the dotted line in the change speed diagram of FIG. 9 and is set to the tentative target gearshift position SPtmp at step S271. A change speed diagram for a step automatic transmission having a preset number of different speeds corresponding to the number of the virtual gearshift positions may be used as the change speed diagram of FIG. 9. The tentative target gearshift position SPtmp is then reset to the greater between the tentative target gearshift position SPtmp set at step S271 and a minimum gearshift position SPmin(V) determined corresponding to the vehicle speed V input at step S100 (step S272).

The CPU 72 subsequently sets a current value of the object gearshift position SP* as the control object of gearshift position, based on the tentative target gearshift position SPtmp set at step S272, a previous value of the object gearshift position SP*, and a boundary value Srt given as upper and lower limits of a variation of the object gearshift position SP* per unit time (for example, the time interval of execution of the drive control routine) (step S273). A concrete operation of step S273 selects the greater between the tentative target gearshift position SPtmp set at step S272 and the result of subtraction of the boundary value Srt from the previous value of the object gearshift position SP* and sets the smaller between the selected greater value and the result of addition of the boundary value Srt to the previous value of the object gearshift position SP* to the current value of the object gearshift position SP* according to Equation (6) given below:

$$SP^* = \min(\max(SPtmp, \text{Previous } SP^* - Srt), \text{Previous } SP^* + Srt) \quad (6)$$

Figure 10:
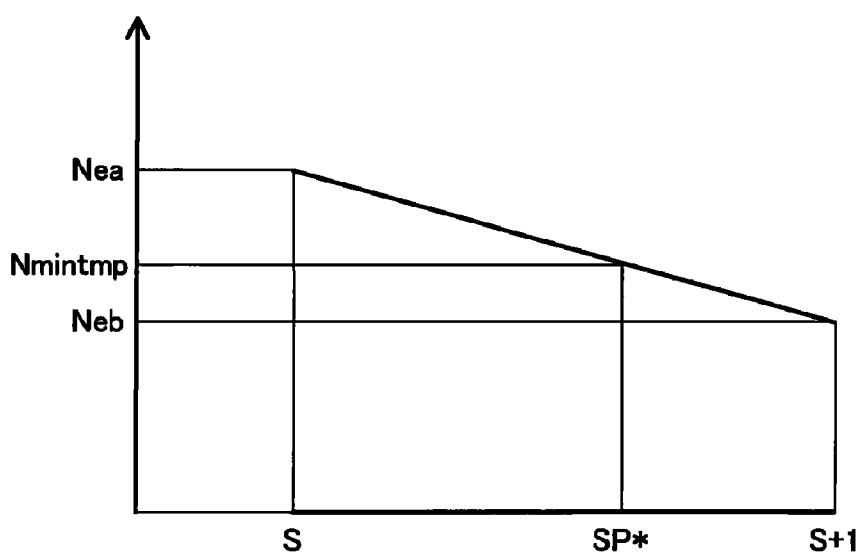
FIG. 10 is an explanatory view showing a procedure of setting a tentative minimum rotation speed Nmintmp based on an integer portion S, an object gearshift position SP*, and tentative rotation speeds Nea and Neb.

In this embodiment, the boundary value Srt is a positive decimal value smaller than 1. The object gearshift position SP* is thus set to primarily take a mixed decimal value and gently change based on the boundary value Srt as a gentle change restriction and the tentative target gearshift position SPtmp suitable for the driving conditions of the hybrid vehicle 20 (the accelerator opening Acc and the vehicle speed V). Since the virtual gearshift positions SP1 to SP8 adopted in the hybrid vehicle 20 of the embodiment are not real but virtual, the object gearshift position SP* can take a mixed decimal value unlike the vehicle equipped with a conventional step automatic transmission. After setting the object gearshift position SP* at step S273, the CPU 72 extracts an integer part S of the object gearshift position SP* (step S274) and sets a minimum engine speed for the object gearshift position SP*, which is read corresponding to the combination of the extracted integer part S and the vehicle speed V input at step S100 from the minimum engine speed setting map of FIG. 8, to a tentative minimum rotation speed Nmintmp (step S275). A concrete operation of step S275 in the embodiment specifies a tentative rotation speed Nea that is equivalent to a minimum engine speed read corresponding to the combination of the vehicle speed V and a gearshift position SP=S representing a virtual gearshift position immediately below the object gearshift position SP* from the minimum engine speed setting map of FIG. 8. The operation also specifies a tentative rotation speed Neb that is equivalent to a minimum engine speed read corresponding to the combination of the vehicle speed V and a gearshift position SP=S+1 representing a virtual gearshift position immediately above the object gearshift position SP* from the minimum engine speed setting map of FIG. 8. The operation then computes the tentative minimum rotation speed Nmintmp from the integer part S, the object gearshift position SP*, and the tentative rotation speeds Nea and Neb according to Equation (7) given below by linear interpolation as shown in FIG. 10:

$$Nmintmp = (S-SP^*+1) \cdot Nea + (Sp^*-S) \cdot Neb \qquad (7)$$

The CPU 72 then specifies a limit rotation speed Nlim that is equivalent to a minimum engine speed read corresponding to the gearshift position SP and the vehicle speed V input at step S100 from the minimum engine speed setting map of FIG. 8, and sets the greater between the tentative minimum rotation speed Nmintmp and the limit rotation speed Nlim to the minimum engine speed Nemin (step S276). This operation of step S276 allows the minimum engine speed Nemin to be set with restriction of the driver's selected virtual gearshift position (that is, the virtual gearshift position corresponding to the speed displayed on the speed indicator 92) as an upper limit of the object gearshift position SP*. After setting the minimum engine speed Nemin at step S270 according to the above procedure, the CPU 72 executes the processing of step S260 and steps S180 to 220 in the flowchart of FIG. 2.

In the hybrid vehicle 20 of the embodiment, in the case of no change of the virtual gearshift position regardless of selection of the S position as the gearshift position SP in the accelerator-on state, the drive control routine sets the tentative target gearshift position SPtmp to the virtual gearshift position selected among the multiple virtual gearshift positions SP1 to SP8 according to the driving conditions of the hybrid vehicle 20 with reference to the change speed diagram, regardless the driver's selected virtual gearshift position (that is, regardless of the speed of the virtual gearshift position displayed on the speed indicator 92), and sets the object gearshift position SP* based on the tentative target gearshift position SPtmp and the boundary value Srt to enable a gentle change with a variation of smaller than 1 (steps S271 to S273). The drive control routine subsequently computes the minimum rotation speed Nemin of the engine 22 corresponding to the object gearshift position SP* (that is, the actual drive point of the engine 22) from the tentative rotation speeds Nea and Neb, which are specified in correlation to the virtual gearshift positions immediately below and immediately above the object gearshift position SP* with reference to the minimum engine speed setting map (steps S274 to S276). In the accelerator-on state, the torque demand Tr* is set in the same restriction, regardless of the gearshift position SP. The operations of the engine 22 and the motors MG1 and MG2 are thus controlled to drive the engine 22 at a drive point defined by the minimum engine speed Nemin and to ensure output of a torque substantially based on the torque demand Tr* for the object gearshift position SP* to the ring gear shaft 32a as the axle (steps S180 to S220).

Figure 11:
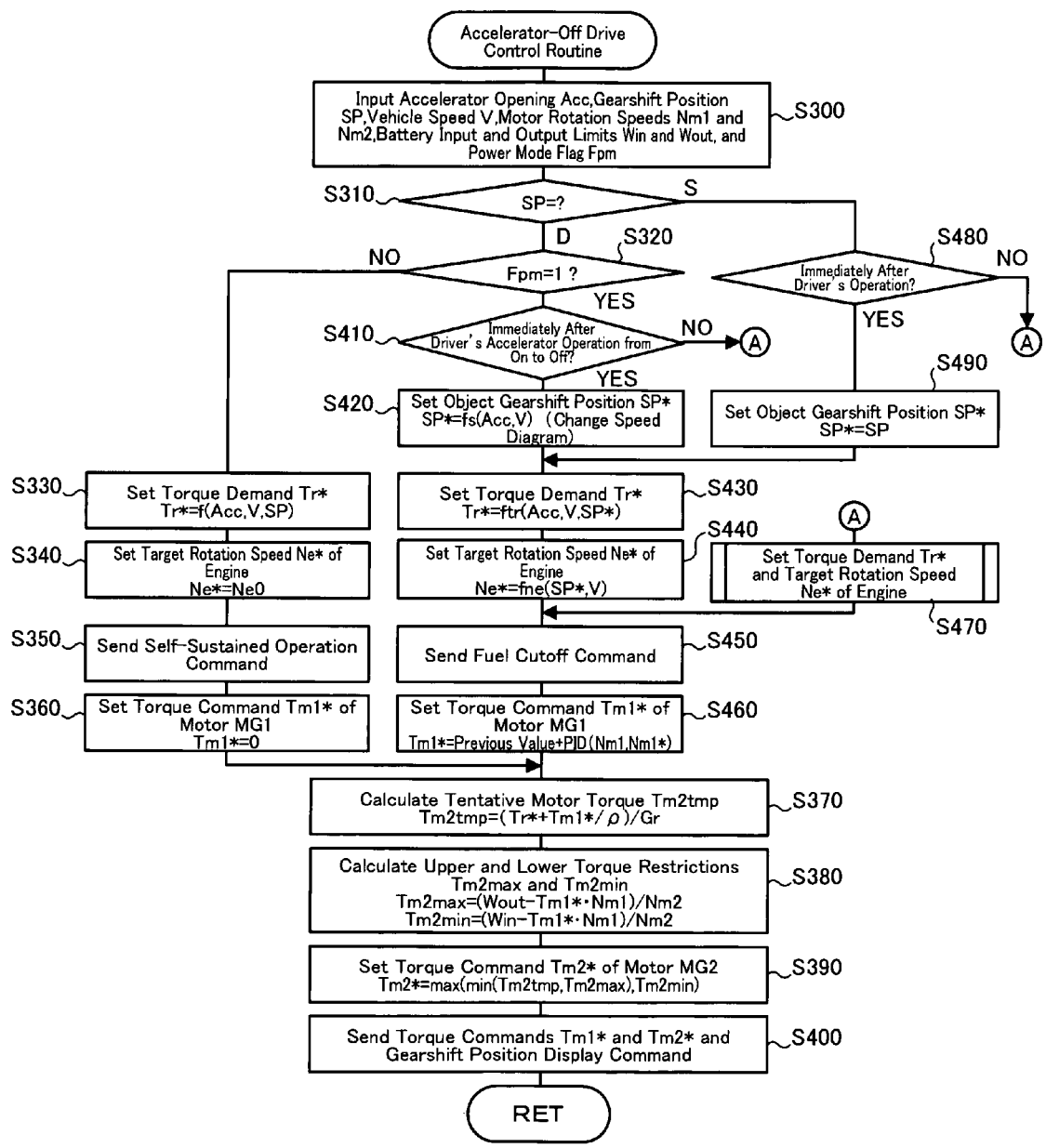
FIG. 11 is a flowchart showing an accelerator-off drive control routine executed by the hybrid ECU.
Figure 12:
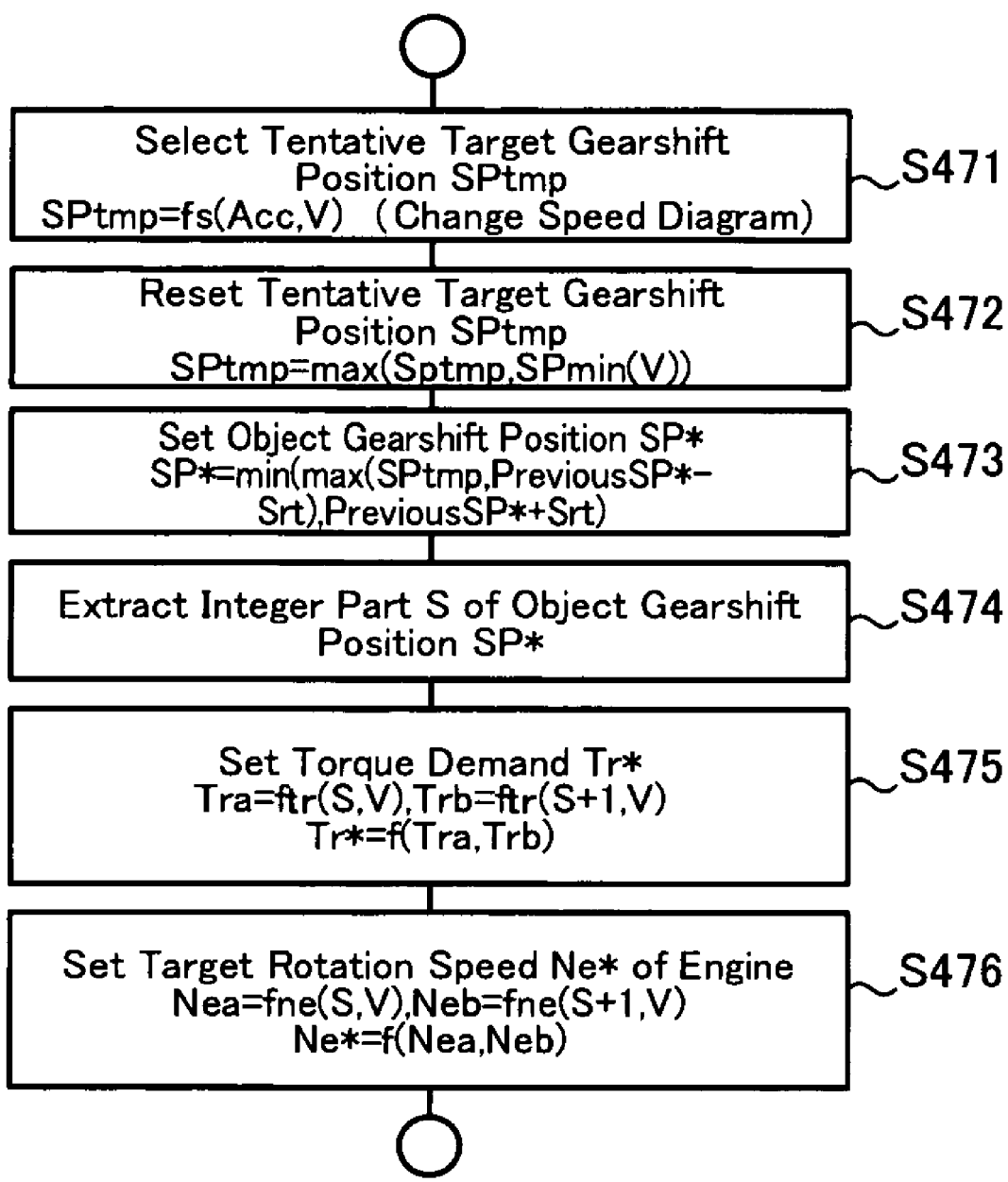
FIG. 12 is a flowchart showing the details of setting a torque demand Tr* and the target rotation speed Ne* at step S470 in the accelerator-off drive control routine of FIG. 11.

The following description regards a series of drive control in the hybrid vehicle 20 in the accelerator-off state induced by the driver's release of the accelerator pedal 83 with reference to FIGS. 11 and 12 and other relevant drawings. FIG. 11 is a flowchart showing an accelerator-off drive control routine repeatedly executed by the hybrid ECU 70 at preset time intervals (for example, at every several msec) in the accelerator-off state specified by the driver's accelerator operation. FIG. 12 is a flowchart showing the details of setting the torque demand Tr* and the target rotation speed Ne* at step S470 in the accelerator-off drive control routine of FIG. 11.

On the start of the accelerator-off drive control routine of FIG. 11, in the same manner as step S100 in the drive control routine of FIG. 2, the CPU 72 of the hybrid ECU 70 first inputs various data required for control, that is, the accelerator opening Acc from the accelerator pedal position sensor 84, the gearshift position SP from the gearshift position sensor 82, the vehicle speed V from the vehicle speed sensor 87, the rotation speeds Nm1 and Nm2 of the motors MG1 and MG2, the input limit Win and the output limit Wout of the battery 50, and the setting of the power mode flag Fpm (step S300). The CPU 72 then identifies the gearshift position SP input at step S300 among the D position and the virtual gearshift positions SP1 to SP8 (step S310) and, upon identification of the D position as the gearshift position SP, determines whether the drive mode of the hybrid vehicle 20 is the normal mode or the power mode, based on the input setting of the powermode flag Fpm (step S320). In the case of selection of the normal mode as the drive mode represented by the power mode flag Fpm equal to 0, a torque demand Tr* required by the driver is set corresponding to the accelerator opening Acc (=0%), the vehicle speed V, and the gearshift position SP (=D) input at step S300 with reference to the torque demand setting map of FIG. 5 (step S330). The torque demand setting map is designed to decrease a driving force (that is, to increase a braking force) responding to an identical value of the vehicle speed V in a descending order of the virtual gearshift position from SP8 to SP1 in the accelerator-off state with the accelerator opening Acc=0%. In the torque demand setting map of FIG. 5, the same driving force is given for the D position and the virtual gearshift position SP8. In the hybrid vehicle 20 of the embodiment, different torque demand setting restrictions (driving force demand setting restrictions) are correlated to the virtual gearshift positions SP1 to SP8 in the accelerator-off state (with the accelerator opening Acc=0%). As clearly understood from the torque demand setting map of FIG. 5, at a relatively high level of the vehicle speed V in the accelerator-off state specified by the driver's accelerator operation, the torque demand Tr* is set as a braking torque (negative torque). After setting the torque demand Tr* at step S330, the CPU 72 sets the target rotation speed Ne* of the engine 22 to a predetermined self-sustained rotation speed Ne0 (step S340) and sends a self-sustained operation command to the engine ECU 24 to make a self-sustained operation of the engine 22 at the self-sustained rotation speed Ne0 with substantially no torque output (step S350). The self-sustained rotation speed Ne0 may be, for example, a rotation speed at idle. The CPU 72 then sets the torque command Tm1* of the motor MG1 to 0 (step S360) and executes the processing of steps S370 to S390, which is equivalent to the processing of steps S190 to S210 in the drive control routine of FIG. 2. The CPU 72 sends the torque commands Tm1* and Tm2* of the motors MG1 and MG2 to the motor ECU 40 and the gearshift position display command to the meter ECU 95 (step S400).

In the case of selection of the power mode as the drive mode represented by the power mode flag Fpm equal to 1 at step S320, on the other hand, it is determined whether the current moment is immediately after the driver's accelerator operation to change from the accelerator-on state to the accelerator-off state (step S410). When it is determined that the current moment is immediately after the driver's release of the accelerator pedal 83, the CPU 72 sets the object gearshift position SP* suitable for the driving conditions of the hybrid vehicle 20 selected among the virtual gearshift positions SP1 to SP8 based on the accelerator opening Acc and the vehicle speed V input at step S300 with reference to the change speed diagram of FIG. 9 (step S420). The processing of step S420 basically follows the procedure of step S271 described previously with reference to the flowchart of FIG. 3. For example, in the accelerating state of the hybrid vehicle 20 with the driver's release of the accelerator pedal 83 on a downhill, a target speed corresponding to the combination of the given accelerator opening Acc and the vehicle speed V is selected from the upshift curves of the solid line in the change speed diagram of FIG. 9 and is set to the object gearshift position SP*. In the decelerating state of the hybrid vehicle 20, a target speed corresponding to the combination of the given accelerator opening Acc and the vehicle speed V is selected from the downshift curves of the dotted line in the change speed diagram of FIG. 9 and is set to the object gearshift position SP*. The CPU 72 subsequently sets the torque demand Tr* corresponding to the accelerator opening Acc (=0%) and the vehicle speed V input at step S300 and the object gearshift position SP* with reference to the torque demand setting map of FIG. 5 (step S430). The CPU 72 refers to the minimum engine speed setting map of FIG. 8 to specify a minimum engine speed corresponding to the object gearshift position SP* set at step S420 and the vehicle speed V input at step S300 and sets the specified minimum engine speed to the target rotation speed Ne* of the engine 22 (step S440). The CPU 72 sends a fuel cutoff command to the engine ECU 24 to stop the fuel supply to the engine 22 (step S450), computes the torque command Tm1* of the motor MG1 from the target rotation speed Nm1* of the motor MG1, which is obtained by computation similar to that of step S180 in the drive control routine of FIG. 2, according to Equation (8) given below (step S460), and executes the processing of steps S370 to S400:

$$Tm1^* = \text{Previous}Tm1^* + k10 \cdot (Nm1^* - Nm1) + k20 \cdot \int (Nm1^* - Nm1)dt \quad (8)$$

In Equation (8) given above, 'k10' in the second term and 'k20' in the third term on the right side respectively denote a gain of the proportional and a gain of the integral term. In the hybrid vehicle 20 of the embodiment, in response to the driver's accelerator operation to change from the accelerator-on state to the accelerator-off state in the power mode selected as the drive mode, the operations of the engine 22 and the motors MG1 and MG2 are controlled to make the motor MG1 rotate the crankshaft 26 of the engine 22 in the fuel cutoff state at the target rotation speed Ne* and to ensure output of a torque (braking torque) based on the torque demand Tr* to the ring gear shaft 32a as the axle. Motoring the engine 22 in the fuel cutoff state in this manner by means of the motor MG1 enables a friction torque of the engine 22 to be output to the ring gear shaft 32a as the axle.

When it is determined at step S410 that the current moment is not immediately after the driver's release of the accelerator pedal 83, the CPU 72 sets the torque demand Tr* and the target rotation speed Ne* of the engine 22 at step S470. The details of the processing at step S470 are shown in the flowchart of FIG. 12. The CPU 72 sets the tentative target gearshift position SPtmp by execution of steps S471 and S472 that are equivalent to the processing of steps S271 and 272 in the flowchart of FIG. 3, and sets the object gearshift position SP* by execution of step S473 that is equivalent to the processing of step S273 in the flowchart of FIG. 3. Namely the object gearshift position SP* is set to primarily take a mixed decimal value and gently change based on the boundary value Srt as the gentle change restriction and the tentative target gearshift position SPtmp suitable for the driving conditions of the hybrid vehicle 20 (the accelerator opening Acc and the vehicle speed V). After setting the object gearshift position SP* at step S473, the CPU 72 extracts an integer part S of the object gearshift position SP* (step S474) and sets the torque demand Tr* for the object gearshift position SP*, based on the combination of the extracted integer part S and the vehicle speed V input at step S300 with reference to the torque demand setting map of FIG. 5 (step S475). A concrete operation of step S475 in the embodiment specifies a tentative torque demand Tra that is equivalent to a torque demand corresponding to the combination of the vehicle speed V and a gearshift position SP=S representing a virtual gearshift position immediately below the object gearshift position SP* from the torque demand setting map of FIG. 5. The operation also specifies a tentative torque demand Trb that is equivalent to a torque demand corresponding to the combination of the vehicle speed V and a gearshift position SP=S+1 representing a virtual gearshift position immediately above the object gearshift position SP* from the torque demand setting map of FIG. 5. The operation then computes the torque demand Tr* for the object gearshift position SP* from the integer part S, the object gearshift position SP*, and the tentative torque demands Tra and Trb according to Equation (9) given below:

$$Tr^* = (S - SP^* + 1) \cdot Tra + (Sp^* - S) \cdot Trb \quad (9)$$

The CPU 72 subsequently sets the target rotation speed Ne* of the engine 22 for the object gearshift position SP*, based on the combination of the integer part S and the vehicle speed V input at step S300 with reference to the minimum engine speed setting map of FIG. 8 (step S476). A concrete operation of step S476 in the embodiment specifies a tentative rotation speed Nea that is equivalent to a minimum engine speed read corresponding to the combination of the vehicle speed V and the gearshift position SP=S representing the virtual gearshift position immediately below the object gearshift position SP* from the minimum engine speed setting map of FIG. 8. The operation also specifies a tentative rotation speed Neb that is equivalent to a minimum engine speed read corresponding to the combination of the vehicle speed V and the gearshift position SP=S+1 representing the virtual gearshift position immediately above the object gearshift position SP* from the minimum engine speed setting map of FIG. 8. The operation then computes the target rotation speed Ne* of the engine 22 from the integer part S, the object gearshift position SP*, and the tentative rotation speeds Nea and Neb according to Equation (10) given below:

$$Ne^* = (S - SP^* + 1) \cdot Nea + (Sp^* - S) \cdot \text{Neb} \quad (10)$$

Equations (9) and (10) are relational expressions obtained in a similar manner to the linear interpolation as shown in FIG. 10 according to Equation (7) given above at step S275 in the flowchart of FIG. 3. After setting the torque demand Tr* and the target rotation speed Ne* of the engine 22 at step S470 according to the above procedure, the CPU 72 executes the processing of steps S450 and S460 and steps S370 to 400 in the flowchart of FIG. 11. In response to the driver's accelerator operation to the accelerator-off state in the power mode selected as the drive mode, the accelerator-off drive control routine once executes the processing of steps S420 to S460 and steps S370 and S400. The subsequent cycle of this accelerator-off drive control routine sets the tentative target gearshift position SPtmp to the virtual gearshift position selected among the multiple virtual gearshift positions SP1 to SP8 according to the driving conditions of the hybrid vehicle 20 with reference to the change speed diagram, and sets the object gearshift position SP* based on the tentative target gearshift position SPtmp and the boundary value Srt to enable a gentle change with a variation of smaller than 1 (steps S471 to S473) The cycle of the accelerator-off drive control routine subsequently computes the torque demand Tr* corresponding to the object gearshift position SP* from the tentative torque demands Tra and Trb, which are specified in correlation to the virtual gearshift positions immediately below and immediately above the object gearshift position SP* with reference to the torque demand setting map, and computes the target rotation speed Ne* of the engine 22 corresponding to the object gearshift position SP* from the tentative rotation speeds Nea and Neb, which are specified in correlation to the virtual gearshift positions immediately below and immediately above the object gearshift position SP* with reference to the minimum engine speed setting map (steps S474 to S476). The operations of the engine 22 and the motors MG1 and MG2 are then controlled to make the motor MG1 rotate the crankshaft 26 of the engine 22 in the fuel cutoff state at the target rotation speed Ne* and to ensure output of a torque (braking torque) based on the torque demand Tr* to the ring gear shaft 32a as the axle (steps S450 and S460 and steps S370 to S400).

Upon identification of one of the virtual gearshift positions SP1 to SP8 at the S position as the gearshift position SP at step S310, it is determined whether the current moment is immediately after the driver's accelerator operation to change from the accelerator-on state to the accelerator-off state or immediately after the driver's gearshift operation to set the upshift instruction position or the downshift instruction position (step S480). When it is determined that the current moment is either immediately after the driver's accelerator-off operation or immediately after the driver's gearshift operation, the CPU 72 sets the gearshift position SP input at step S300 to the object gearshift position SP* as the control object of gearshift position (step S490) and executes the processing of steps S430 to S460 and steps S370 to S400. In the hybrid vehicle 20 of the embodiment, in response to the driver's accelerator operation to change from the accelerator-on state to the accelerator-off state or in response to the driver's gearshift operation to change the virtual gearshift position at the S position selected as the gearshift position SP, the operations of the engine 22 and the motors MG1 and MG2 are controlled to make the motor MG1 rotate the crankshaft 26 of the engine 22 in the fuel cutoff state at the target rotation speed Ne* corresponding to the driver's selected virtual gearshift position and to ensure output of a torque (braking torque) based on the torque demand Tr* corresponding to the driver's selected virtual gearshift position to the ring gear shaft 32a as the axle.

When it is determined at step S480 that the current moment is neither immediately after the driver's accelerator-off operation nor immediately after the driver's gearshift operation, on the other hand, the CPU 72 sets the torque demand Tr* and the target rotation speed Ne* of the engine 22 at step S470 according to the procedure explained previously and executes the processing of steps S450 and S460 and steps S370 to S400. In the hybrid vehicle 20 of the embodiment, in the case of no change of the virtual gearshift position via the driver's setting of the upshift instruction position or the downshift instruction position regardless of selection of the S position as the gearshift position SP in the accelerator-off state, the accelerator-off drive control routine sets the tentative target gearshift position SPtmp to the virtual gearshift position selected among the multiple virtual gearshift positions SP1 to SP8 according to the driving conditions of the hybrid vehicle 20 with reference to the change speed diagram, regardless the driver's selected virtual gearshift position (that is, regardless of the speed of the virtual gearshift position displayed on the speed indicator 92), and sets the object gearshift position SP* based on the tentative target gearshift position SPtmp and the boundary value Srt to enable a gentle change with a variation of smaller than 1 (steps S471 to S473). The accelerator-off drive control routine subsequently computes the torque demand Tr* corresponding to the object gearshift position SP* from the tentative torque demands Tra and Trb, which are specified in correlation to the virtual gearshift positions immediately below and immediately above the object gearshift position SP* with reference to the torque demand setting map, and computes the target rotation speed Ne* of the engine 22 corresponding to the object gearshift position SP* from the tentative rotation speeds Nea and Neb, which are specified in correlation to the virtual gearshift positions immediately below and immediately above the object gearshift position SP* with reference to the minimum engine speed setting map (steps S474 to S476). The operations of the engine 22 and the motors MG1 and MG2 are then controlled to make the motor MG1 rotate the crankshaft 26 of the engine 22 in the fuel cutoff state at the target rotation speed Ne* and to ensure output of a torque (braking torque) based on the torque demand Tr* to the ring gear shaft 32a as the axle (steps S450 and S460 and steps S370 to S400).

As described above, the hybrid vehicle 20 of the embodiment uses the multiple driving restrictions provided in correlation to the multiple virtual gearshift positions. The driving restriction includes the torque demand setting restriction for setting the torque demand Tr* required for driving and the drive point setting restriction (target rotation speed setting restriction) of the engine 22. The multiple driving restrictions are provided respectively in correlation to the multiple virtual gearshift positions SP1 to SP8 such as to allow a difference in at least either the torque demand setting restriction or the drive point setting restriction of the engine 22 among the respective virtual gearshift positions SP1 to SP8 and are stored in the form of the torque demand setting map and the minimum engine speed setting map in the ROM 74. The hybrid vehicle 20 has the gearshift lever 81 that allows the driver to make selection between the D position for ordinary driving and the S position with the multiple virtual gearshift positions SP1 to SP8 and allows the driver to select any virtual gearshift position among the multiple virtual gearshift positions SP1 to SP8 at the S position. The hybrid vehicle 20 makes control in response to the driver's selection among the multiple virtual gearshift positions SP1 to SP8 and thereby performs an operation simulating the conventional change speed process in the general automobile. In the hybrid vehicle 20 of the embodiment, in the case of no change of the virtual gearshift position regardless of selection of the S position as the gearshift position SP or in the case of selection of the power mode in combination with the driver's accelerator operation to the accelerator-off state (upon satisfaction of the conditions) the tentative target gearshift position SPtmp is set to the virtual gearshift position selected among the multiple virtual gearshift positions SP1 to SP8 according to the driving conditions of the hybrid vehicle 20 (for example, the vehicle speed V) with reference to the change speed diagram of FIG. 9 as a change speed restriction(steps S271 and S272 in FIG. 3, steps S471 and S472 in FIG. 12). The object gearshift position SP* is set based on the tentative target gearshift position SPtmp and the boundary value Srt as a gentle change restriction to enable a gentle change with a variation of smaller than 1 (step S273 in FIG. 3, step S473 in FIG. 12). The torque demand Tr* and the target rotation speed Ne* of the engine 22 corresponding to the object gearshift position SP* are computed from the tentative torque demands Tra and Trb and the tentative rotation speeds Nea and Neb of the engine 22, which are specified in correlation to the virtual gearshift positions (SP=S, S+1) immediately below and immediately above the object gearshift position SP* with reference to the torque demand setting map and the minimum engine speed setting map (steps S274 to S276 in FIG. 3 in combination with steps S140 and S260 in FIG. 2, steps S474 to S476 in FIG. 12). The operations of the engine 22 and the motors MG1 and MG2 are then controlled to drive the engine 22 at the set target rotation speed Ne* and to ensure output of a torque substantially based on the set torque demand Tr* to the ring gear shaft 32a as the axle (steps S180 to S220 in FIG. 2, steps S450, S460, and S370 to S400 in FIG. 11). In the hybrid vehicle 20 with the multiple virtual gearshift positions SP1 to SP8 correlated to the driving restrictions, the object gearshift position SP* is set based on the boundary value Srt and the tentative target gearshift position SPtmp, which is specified according to the driving conditions of the hybrid vehicle 20, to enable a gentle change. The torque demand Tr* and the drive point of the engine 22 corresponding to the object gearshift position SP* are set with the driving restrictions correlated to the virtual gearshift positions immediately below and immediately above the object gearshift position SP*. These settings allow a gentle variation in driving torque (including braking torque) and a gentle change of the drive point of the engine 22 by utilizing the multiple driving restrictions correlated to the multiple virtual gearshift positions SP1 to SP8, upon satisfaction of the conditions. Such drive control enables the hybrid vehicle 20 to perform an operation simulating the conventional change speed process in the general automobile and to selectively use a stepwise variation and a gentle variation in torque demand Tr* required for driving as well as a stepwise change and a gentle change of the drive point of the engine 22 based on the torque demand Tr*. This ensures adequate settings of the torque demand Tr* required for driving and the drive point of the engine 22.

In the case of no change of the virtual gearshift position regardless of selection of the S position as the gearshift position SP, it may be regarded that the driver does not demand a stepwise variation in torque demand Tr* or a stepwise change of the drive point of the engine 22. In such cases, the drive control enables a gentle variation in driving torque and a gentle change of the drive point of the engine 22 corresponding to the object gearshift position SP*, which gently changes based on the boundary value Srt and the tentative target gearshift position SPtmp specified according to the driving conditions of the hybrid vehicle 20. This arrangement ensures smooth driving of the hybrid vehicle 20 with adequate settings of the torque demand Tr* and the drive point of the engine 22 according to the driving conditions of the hybrid vehicle 20. In the embodiment described above, the multiple driving restrictions in the accelerator-off state are provided in correlation to the multiple virtual gearshift positions SP1 to SP8 such as to allow differences both in torque demand setting restriction and in drive point setting restriction of the engine 22 among the respective virtual gearshift positions SP1 to SP8. In the case of no change of the virtual gearshift position regardless of selection of the S position as the gearshift position SP in the accelerator-off state specified by the driver's accelerator operation, such correlation ensures smooth driving of the hybrid vehicle 20 with adequate settings of the torque demand Tr* (braking torque) and the drive point of the engine 22 in the accelerator-off state according to the driving conditions of the hybrid vehicle 20. In the embodiment described above, the multiple driving restrictions in the accelerator-on state are provided in correlation to the multiple virtual gearshift positions SP1 to SP8 such as to allow a difference in drive point setting restriction of the engine 22 among the respective virtual gearshift positions SP1 to SP8. In the case of no change of the virtual gearshift position regardless of selection of the S position as the gearshift position SP in the accelerator-on state specified by the driver's accelerator operation, such correlation ensures smooth driving of the hybrid vehicle 20 with a smooth variation in rotation speed Ne of the engine 22. In general, the multiple driving restrictions in the accelerator-off state and the multiple driving restrictions in the accelerator-on state may be correlated to the multiple virtual gearshift positions SP1 to SP8 such as to allow a difference in at least either the torque demand setting restriction or the drive point setting restriction of the engine 22 among the respective virtual gearshift positions SP1 to SP8. In one application using two virtual gearshift positions, at least the torque demand setting restriction is designed to allow a difference between the two virtual gearshift positions. One mode of the torque demand setting restriction is correlated to the D position for ordinary driving, and the other mode of the torque demand setting restriction (preferably for setting a greater torque demand as a braking force in the accelerator-off state) is correlated to a braking position.

As described above, in response to the driver's operation of the mode switch 88, the hybrid vehicle 20 of the embodiment selects the drive mode between the normal mode (first drive mode) for ordinary driving and the power mode (second drive mode) having the better response of torque output to the driver's accelerator operation than the response in the normal mode. In selection of the power mode as the drive mode, the object accelerator opening Acc* as the control object of accelerator opening is set corresponding to the driver's setting of the accelerator opening Acc with reference to the accelerator opening setting map in the power mode (see step S130 in the drive control routine of FIG. 2). This basically sets a larger value to the torque demand Tr* in the power mode than the value of the torque demand Tr* in the normal mode (see step S140 in FIG. 2). In the structure of allowing selection of the drive mode, in the accelerator-off state with the accelerator opening Acc set to 0%, simple application of the accelerator opening setting map in the power mode can not change the power output characteristic. In order to allow a difference in power output characteristic between the power mode and the normal mode in the accelerator-off state specified by the driver's accelerator operation, a power output characteristic curve in the accelerator-off state in the power mode should be provided separately from a power output characteristic curve in the accelerator-off state in the normal mode. In selection of the power mode in the accelerator-off state specified by the driver's accelerator operation, the procedure of the embodiment executes the processing of step S470 in FIG. 11 (steps S471 to S476 in FIG. 12) with the multiple driving restrictions correlated to the multiple virtual gearshift positions SP1 to SP8 at the S position. This enables the power output characteristic, that is, the torque demand Tr* (braking torque) and the drive point of the engine 22, in the power mode to be different from that in the normal mode in the accelerator-off state specified by the driver's accelerator operation, while ensuring the adequate settings according to the driving conditions of the hybrid vehicle 20.

The hybrid vehicle 20 of the embodiment utilizes the boundary value Srt as the gentle change restriction to limit both an upshift change and a downshift change of the object gearshift position SP* in a range of smaller than 1. This arrangement enables an adequate gentle change of the object gearshift position SP* in both the upshift direction and the downshift direction according to the driving conditions of the hybrid vehicle 20. The object gearshift position SP* gently changes in the downshift direction with a decrease in vehicle speed V in continuation of the accelerator-off state in combination with selection of the S position or the power mode or in response to the driver's release of the accelerator pedal 83 at the S position. This enables smooth driving of the hybrid vehicle 20 with a gentle increase in torque demand Tr* in the braking direction or with a gentle increase in rotation speed Ne of the engine 22. The object gearshift position SP* gently changes in the upshift direction, on the other hand, with an increase in vehicle speed V on a downhill in continuation of the accelerator-off state in combination with selection of the S position or the power mode. This restricts a decrease in torque demand Tr* as the braking torque and a decrease in rotation speed Ne of the engine 22 to ensure application of a desired braking force in the accelerator-off state, while facilitating output of a friction torque from the engine 22. The boundary value Srt may be different between the accelerator-on state and the accelerator-off state. The gentle change restriction may limit the change in object gearshift position SP* in the range of smaller than 1 in only either the upshift direction or the downshift direction. The gentle change restriction may adopt a smoothing operation with a preset time constant. Application of the change speed diagram defining the variations in accelerator opening Acc against the vehicle speed V with regard to the multiple virtual gearshift positions SP1 to SP8 as shown in FIG. 9 ensures the adequate setting of the tentative target gearshift position SPtmp according to the driving conditions of the hybrid vehicle 20.

Figure 13:
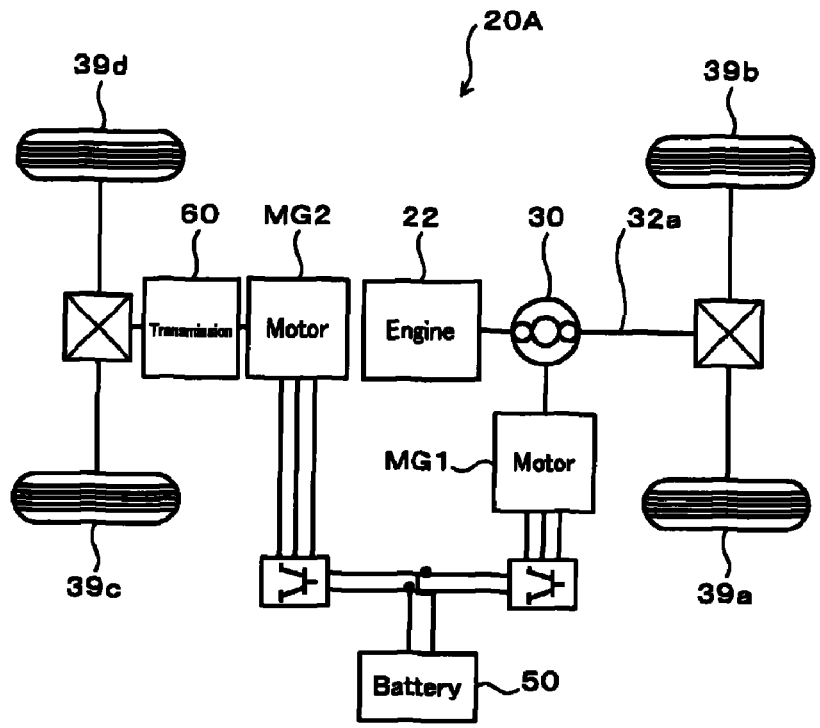
FIG. 13 schematically illustrates the configuration of another hybrid vehicle in one modified example.
Figure 14:
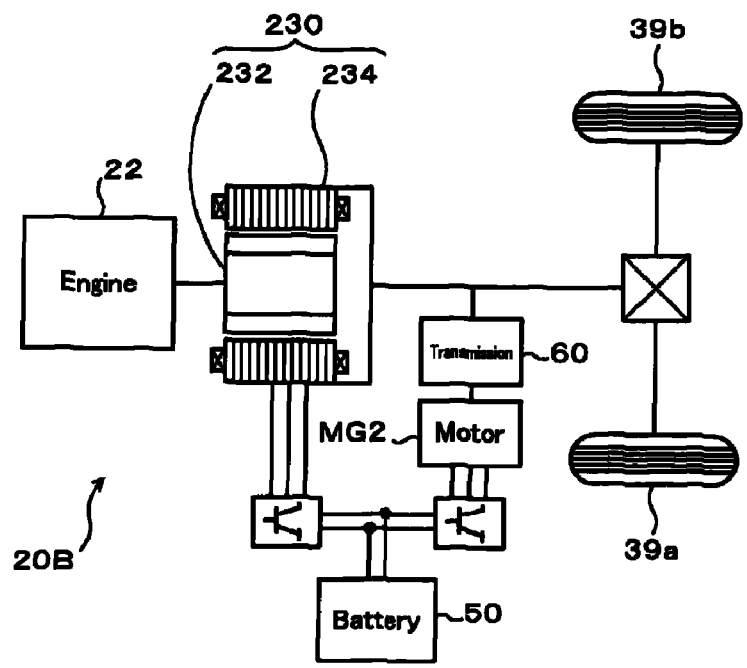
FIG. 14 schematically illustrates the configuration of still another hybrid vehicle in another modified example.

The hybrid vehicle 20 of the embodiment has the gearshift lever 81 that allows the driver to make selection between the D position for ordinary driving and the S position with the multiple virtual gearshift positions SP1 to SP8 and allows the driver to select any virtual gearshift position among the multiple virtual gearshift positions SP1 to SP8 at the S position. The technique of the invention is, however, not restrictively applied to this structure but may be applicable to a hybrid vehicle that is provided with multiple virtual gearshift positions but does not allow the driver to select desired one of the multiple virtual gearshift positions. In the hybrid vehicle 20 of the embodiment, the ring gear shaft 32a as the axle is linked with the motor MG2 via the reduction gear 35 of reducing the rotation speed of the motor MG2 and transmitting the reduced rotation speed to the ring gear shaft 32a. The reduction gear 35 is, however, not essential but may be replaced by a transmission that has two different speeds, Hi and Lo, or three or more different speeds to change the rotation speed of the motor MG2 and transmit the changed rotation speed to the ring gear shaft 32a. In the hybrid vehicle 20 of the embodiment, the power of the motor MG2 is output to the axle linked with the ring gear shaft 32a. The technique of the invention is, however, not restricted to this configuration but is also applicable to a hybrid vehicle 20A of one modified structure shown in FIG. 13. In the hybrid vehicle 20A of FIG. 13, the power of the motor MG2 is output to another axle (an axle linked with wheels 39c and 39d) that is different from the axle connecting with the ring gear shaft 32a (the axle linked with the drive wheels 39a and 39b). In the hybrid vehicle 20 of the embodiment, the power of the engine 22 is transmitted via the power distribution integration mechanism 30 to the ring gear shaft 32a as the axle linked with the drive wheels 39a and 39b. The technique of the invention is, however, not restricted to this configuration but is also applicable to a hybrid vehicle 20B of another modified structure shown in FIG. 14. The hybrid vehicle 20B of FIG. 14 is equipped with a pair-rotor motor 230. The pair-rotor motor 230 includes an inner rotor 232 connected to a crankshaft of the engine 22 and an outer rotor 234 connected to an axle for power output to the drive wheels 39a and 39b. The pair-rotor motor 230 transmits part of the output power of the engine 22 to the axle, while converting the residual engine output power into electric power.

The primary elements in the embodiment and its modified examples are mapped to the primary constituents in the claims of the invention as described below. The engine 22 in the embodiment and its modified examples described above corresponds to the 'internal combustion engine' of the invention. The combination of the motor MG1 and the power distribution integration mechanism 30 or the pair-rotor motor 230 corresponds to the 'electric power-mechanical power input output assembly' of the invention. The motor MG2 and the battery 50 of transmitting electric power to and from the motor MG2 are respectively equivalent to the 'motor' and the 'accumulator' of the invention. The ROM 74 storing the multiple driving restrictions correlated to the multiple virtual gearshift positions SP1 to SP8 such as to allow a difference in at least either the torque demand setting restriction or the drive point setting restriction of the engine 22 among the respective virtual gearshift positions SP1 to SP8 corresponds to the 'driving restriction storage unit' of the invention. Here the driving restriction includes the torque demand setting restriction for setting the torque demand Tr* required for driving and the drive point setting restriction of the engine 22 for setting the drive point of the engine 22 based on the torque demand Tr*. The hybrid ECU 70 executing the processing of steps S271 and S272 in FIG. 3 in response to a negative answer at step S230 or executing the processing of steps S471 and S472 in FIG. 12 in response to a negative answer at step S410 or at step S480 in FIG. 11 corresponds to the 'tentative target gearshift position setting module' of the invention. The hybrid ECU 70 executing the processing of step S273 in FIG. 3 or executing the processing of step S473 in FIG. 12 corresponds to the 'object gearshift position setting module' of the invention. The hybrid ECU 70 executing the processing of step S140 in FIG. 2 and the processing of steps S274 to S276 in FIG. 3 or executing the processing of steps S474 to S476 in FIG. 12 is equivalent to the 'object driving condition setting module' of the invention. The hybrid ECU 70 executing the processing of steps 180 to S220 in FIG. 2 or executing the processing of steps S450 and S460 and steps S370 to S400 in FIG. 11 in combination with the engine ECU 24 and the motor ECU 40 corresponds to the 'controller' of the invention. The gearshift lever 81 allowing the driver to make selection between the D position for ordinary driving and the S position with the multiple virtual gearshift positions SP1 to SP8 and allowing the driver to select any virtual gearshift position among the multiple virtual gearshift positions SP1 to SP8 at the S position is equivalent to the 'gearshift position selector' of the invention. The vehicle speed sensor 87 measuring the vehicle speed V is equivalent to the 'vehicle speed sensor' of the invention. The mode switch 88 allowing selection between the normal mode for ordinary driving and the power mode having the tendency of an enhanced response of torque output to the driver's accelerator operation than the response in the normal mode corresponds to the 'drive mode selector' of the invention. The hybrid ECU 70 executing the processing of steps S120 to S140 in FIG. 2 corresponds to the 'driving force demand setting module' of the invention. The motor MG1 and the power distribution integration mechanism 30 are respectively equivalent to the 'motor for power generation' and the 'three shaft-type power input output structure' of the invention.

The 'internal combustion engine' is not restricted to the engine 22 that receives a supply of a hydrocarbon fuel, such as gasoline or light oil, and outputs power, but may be an engine of any other design, for example, a hydrogen engine. The 'electric power-mechanical power input output assembly' is not restricted to the combination of the motor MG1 and the power distribution integration mechanism 30 or to the pair-rotor motor 230 but may be any structure that is connected with a preset axle and with an engine shaft of the internal combustion engine and enables power generation with at least part of the output power of the internal combustion engine as well as input and output of power from and to the preset axle accompanied with input and output of electric power. The 'motor' and the 'motor for power generation' are not restricted to the synchronous motor generators, such as the motors MG2 and MG1, but may be motors of any other design, for example, induction motors. The 'accumulator' is not restricted to the secondary battery, such as the battery 50, but may be an accumulator of any other design that enables transmission of electric power to and from the electric power-mechanical power input output assembly and the motor, for example, a capacitor. The 'controller' is not restricted to the combination of the hybrid ECU 70 with the engine ECU 24 and the motor ECU 40 but may be a controller of any other design, for example, a single electronic control unit, that controls the internal combustion engine, the electric power-mechanical power input output assembly, and the motor to drive the internal combustion engine at a set drive point and to ensure output of a power based on a set driving force demand. The 'gearshift position selector' is not restricted to the gearshift lever 81 but maybe a selector of any other design that allows the driver to make selection between a first gearshift position for ordinary driving and a second gearshift position with multiple virtual gearshift positions and allows the driver to select any virtual gearshift position among the multiple virtual gearshift positions at the second gearshift position. The 'vehicle speed sensor' is not restricted to the vehicle speed sensor 87 but may be an instrument of any other design that enables measurement of the vehicle speed. The 'drive mode selector' is not restricted to the mode switch 88 but may be a selector of any other design that allows selection between a first drive mode for ordinary driving and a second drive mode having tendency of an enhanced response of power output to the driver's accelerator operation than a response in the first drive mode. The 'driving force demand setting module' may have any configuration as long as a driving force demand in response to the driver's accelerator operation is settable with a driving force setting restriction corresponding to the first drive mode or the second drive mode, for example, a configuration of setting the driving force demand irrespective of the vehicle speed V. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many modifications, changes, and alterations without departing from the scope or spirit of the main characteristics of the present invention. The scope and spirit of the present invention are indicated by the appended claims, rather than by the foregoing description.

The disclose of Japanese Patent Application No. 2007-87961 filed Mar. 29, 2007 including specification, drawings and claims is incorporated herein by reference in its entirety.

What is claimed is:
1. A hybrid vehicle, comprising:
an internal combustion engine;
an electric power-mechanical power input output assembly constructed to connect with a preset axle and with an engine shaft of the internal combustion engine and configured to enable output of at least part of power of the internal combustion engine to the preset axle through input and output of electric power and mechanical power;
a motor configured to input and output power from and to either the preset axle or another axle different from the preset axle;
an accumulator configured to transmit electric power to and from the electric power-mechanical power input output assembly and the motor;
a driving restriction storage unit configured to store multiple driving restrictions in correlation to multiple virtual gearshift positions such as to allow a difference in at least either a driving force setting restriction or an engine drive point setting restriction among the respective virtual gearshift positions, each of the multiple driving restrictions including the driving force setting restriction for setting a driving force demand required for driving and the engine drive point setting restriction for setting a drive point of the internal combustion engine corresponding to the driving force demand;
a tentative target gearshift position setting module configured to, upon satisfaction of a predetermined condition, set a tentative target gearshift position to a virtual gearshift position corresponding to a driving condition of the hybrid vehicle, which is selected among the multiple virtual gearshift positions based on a predetermined change speed restriction;
an object gearshift position setting module configured to set an object gearshift position to enable a gentle change with a variation of smaller than 1, based on the set tentative target gearshift position and a predetermined gentle change restriction;
an object driving condition setting module configured to set a driving force demand and a drive point of the internal combustion engine corresponding to the set object gearshift position, based on a tentative driving force demand and a tentative drive point of the internal combustion engine determined with driving restrictions correlated to virtual gearshift positions immediately below and immediately above the set object gearshift position; and
a controller configured to control the internal combustion engine, the electric power-mechanical power input output assembly, and the motor to drive the internal combustion engine at the set drive point and to ensure output of power based on the set driving force demand.

2. The hybrid vehicle in accordance with claim 1, the hybrid vehicle further including:
a gearshift position selector configured to allow a driver to make selection between a first gearshift position for ordinary driving and a second gearshift position with the multiple virtual gearshift positions and allow the driver to select any virtual gearshift position among the multiple virtual gearshift positions at the second gearshift position,
wherein the predetermined condition is satisfied when the second gearshift position is selected but the driver does not change the virtual gearshift position.

3. The hybrid vehicle in accordance with claim 1, the hybrid vehicle further including:
a vehicle speed sensor configured to measure a vehicle speed of the hybrid vehicle, wherein each of the multiple driving restrictions correlated to the multiple virtual gearshift positions includes the driving force setting restriction of defining a variation in driving force demand against the vehicle speed in an accelerator-off state and the engine drive point setting restriction of defining a variation in target rotation speed of the internal combustion engine against the vehicle speed in the accelerator-off state, and the multiple driving restrictions are designed to have differences in both the driving force setting restriction and the engine drive point setting restriction among the respective virtual gearshift positions.

4. The hybrid vehicle in accordance with claim 1, the hybrid vehicle further including:
a vehicle speed sensor configured to measure a vehicle speed of the hybrid vehicle,
wherein each of the multiple driving restrictions correlated to the multiple virtual gearshift positions includes the driving force setting restriction of defining a variation in driving force demand against the vehicle speed in an accelerator-on state and the engine drive point setting restriction of defining a variation in minimum rotation speed of the internal combustion engine against the vehicle speed in the accelerator-on state, and the multiple driving restrictions are designed to have a difference in the engine drive point setting restriction among the respective virtual gearshift positions.

5. The hybrid vehicle in accordance with claim 1, the hybrid vehicle further including:
a drive mode selector configured to allow selection between a first drive mode for ordinary driving and a second drive mode having tendency of an enhanced response of power output to a driver's accelerator operation than a response in the first drive mode; and
a driving force demand setting module configured to set a driving force demand in response to the driver's accelerator operation with a driving force setting restriction corresponding to either the first drive mode or the second drive mode,
wherein the predetermined condition is satisfied when the second drive mode is selected and the driver's accelerator operation specifies an accelerator-off state.

6. The hybrid vehicle in accordance with claim 5, wherein the driving force setting restriction corresponding to the second drive mode tends to set a greater value to the driving force demand against an identical accelerator operation amount, compared with the driving force setting restriction corresponding to the first drive mode.

7. The hybrid vehicle in accordance with claim 1, wherein the gentle change restriction limits a variation of the object gearshift position both in an ascending direction and a descending direction to a range of smaller than 1.

8. The hybrid vehicle in accordance with claim 1, wherein the change speed restriction includes a change speed diagram of defining a relation between the virtual gearshift position, a driver's accelerator operation and a vehicle speed of the hybrid vehicle.

9. The hybrid vehicle in accordance with claim 1, wherein the electric power-mechanical power input output assembly includes:
a motor for power generation configured to input and output power; and
a three shaft-type power input output structure constructed to connect with three shafts, the axle, the engine shaft of the internal combustion engine, and a rotating shaft of the motor for power generation and configured to input and output power to and from a residual shaft based on powers input to and output from any two shafts among the three shafts.

10. A control method of a hybrid vehicle, the hybrid vehicle having: an internal combustion engine; an electric power-mechanical power input output assembly constructed to connect with a preset axle and with an engine shaft of the internal combustion engine and configured to enable output of at least part of power of the internal combustion engine to the preset axle through input and output of electric power and mechanical power; a motor configured to input and output power from and to either the preset axle or another axle different from the preset axle; an accumulator configured to transmit electric power to and from the electric power-mechanical power input output assembly and the motor; and a driving restriction storage unit configured to store multiple driving restrictions in correlation to multiple virtual gearshift positions such as to allow a difference in at least either a driving force setting restriction or an engine drive point setting restriction among the respective virtual gearshift positions, each of the multiple driving restrictions including the driving force setting restriction for setting a driving force demand required for driving and the engine drive point setting restriction for setting a drive point of the internal combustion engine corresponding to the driving force demand,
the control method comprising the steps of:
(a) upon satisfaction of a predetermined condition, setting a tentative target gearshift position to a virtual gearshift position corresponding to a driving condition of the hybrid vehicle, which is selected among the multiple virtual gearshift positions based on a predetermined change speed restriction;
(b) setting an object gearshift position to enable a gentle change with a variation of smaller than 1, based on the tentative target gearshift position set in the step (a) and a predetermined gentle change restriction;
(c) setting a driving force demand and a drive point of the internal combustion engine corresponding to the object gearshift position set in the step (b), based on a tentative driving force demand and a tentative drive point of the internal combustion engine determined with driving restrictions correlated to virtual gearshift positions immediately below and immediately above the set object gearshift position; and
(d) controlling the internal combustion engine, the electric power-mechanical power input output assembly, and the motor to drive the internal combustion engine at the drive point set in the step (c) and to ensure output of power based on the driving force demand set in the step (c).

11. The control method of a hybrid vehicle in accordance with claim 10, the hybrid vehicle further including:
a gearshift position selector configured to allow a driver to make selection between a first gearshift position for ordinary driving and a second gearshift position with the multiple virtual gearshift positions and allow the driver to select any virtual gearshift position among the multiple virtual gearshift positions at the second gearshift position,
wherein the predetermined condition at the step (a) is satisfied when the second gearshift position is selected but the driver does not change the virtual gearshift position.

12. The control method of a hybrid vehicle in accordance with claim 10, the hybrid vehicle further including:
a vehicle speed sensor configured to measure a vehicle speed of the hybrid vehicle, wherein each of the multiple driving restrictions correlated to the multiple virtual gearshift positions includes the driving force setting restriction of defining a variation in driving force demand against the vehicle speed in an accelerator-off state and the engine drive point setting restriction of defining a variation in target rotation speed of the internal combustion engine against the vehicle speed in the accelerator-off state, and the multiple driving restrictions are designed to have differences in both the driving force setting restriction and the engine drive point setting restriction among the respective virtual gearshift positions.

13. The control method of a hybrid vehicle in accordance with claim 10, the hybrid vehicle further including:

a vehicle speed sensor configured to measure a vehicle speed of the hybrid vehicle, wherein each of the multiple driving restrictions correlated to the multiple virtual gearshift positions includes the driving force setting restriction of defining a variation in driving force demand against the vehicle speed in an accelerator-on state and the engine drive point setting restriction of defining a variation in minimum rotation speed of the internal combustion engine against the vehicle speed in the accelerator-on state, and the multiple driving restrictions are designed to have a difference in the engine drive point setting restriction among the respective virtual gearshift positions.

14. The control method of a hybrid vehicle in accordance with claim 10, the hybrid vehicle further including:

a drive mode selector configured to allow selection between a first drive mode for ordinary driving and a second drive mode having tendency of an enhanced response of power output to a driver's accelerator operation than a response in the first drive mode; and a driving force demand setting module configured to set a driving force demand in response to the driver's accelerator operation with a driving force setting restriction corresponding to either the first drive mode or the second drive mode, wherein the predetermined condition at the step (a) is satisfied when the second drive mode is selected and the driver's accelerator operation specifies an accelerator-off state.

15. The control method of a hybrid vehicle in accordance with claim 14, wherein the driving force setting restriction corresponding to the second drive mode tends to set a greater value to the driving force demand against an identical accelerator operation amount, compared with the driving force setting restriction corresponding to the first drive mode.

16. The control method of a hybrid vehicle in accordance with claim 10, wherein the gentle change restriction limits a variation of the object gearshift position both in an ascending direction and a descending direction to a range of smaller than 1.

17. The control method of a hybrid vehicle in accordance with claim 10, wherein the change speed restriction includes a change speed diagram of defining a relation between the virtual gearshift position, a driver's accelerator operation and a vehicle speed of the hybrid vehicle.

* * * * *